United States Patent
Ladely (Guevara) et al.

(10) Patent No.: US 7,820,094 B2
(45) Date of Patent: Oct. 26, 2010

(54) LIGHTWEIGHT CONCRETE COMPOSITIONS

(75) Inventors: Tricia Ladely (Guevara), Beaver, PA (US); Michael T. Williams, Beaver Falls, PA (US); Rick Hughes, Beaver, PA (US); Michael R. Kelley, Butler, PA (US); John K. Madish, Beaver Falls, PA (US); Kristen VanBuskirk, Aliquippa, PA (US)

(73) Assignee: NOVA Chemicals Inc., Moon Township, PA (US)

( * ) Notice: Subject to any disclaimer, the term of this patent is extended or adjusted under 35 U.S.C. 154(b) by 0 days.

(21) Appl. No.: 12/641,724

(22) Filed: Dec. 18, 2009

(65) Prior Publication Data
US 2010/0098524 A1 Apr. 22, 2010

Related U.S. Application Data

(63) Continuation of application No. 11/586,120, filed on Oct. 25, 2006, now Pat. No. 7,658,797, which is a continuation-in-part of application No. 11/387,198, filed on Mar. 22, 2006, now Pat. No. 7,644,548.

(60) Provisional application No. 60/664,230, filed on Mar. 22, 2005, provisional application No. 60/686,858, filed on Jun. 2, 2005.

(51) Int. Cl.
  *B28B 3/00* (2006.01)
(52) U.S. Cl. .................................. 264/333; 264/DIG. 43
(58) Field of Classification Search ................. 264/333, 264/DIG. 43; 106/724, 737, 823
See application file for complete search history.

(56) References Cited

U.S. PATENT DOCUMENTS

| 3,021,291 A | 2/1962 | Thiessen |
| 3,023,175 A | 2/1962 | Rodman, Jr. |
| 3,214,393 A | 10/1965 | Sefton |

(Continued)

FOREIGN PATENT DOCUMENTS

| EP | 0 652 188 | 5/1995 |
| FR | 2 539 410 A1 | 7/1984 |
| JP | 90/71449 | 3/1997 |
| WO | 98/02397 | 1/1998 |
| WO | 00/02826 | 1/2000 |
| WO | 00/61519 | 10/2000 |
| WO | 01/66485 | 9/2001 |

OTHER PUBLICATIONS

Dipl.-Ing. Thorsten et al., High Strength Lightweight-Aggregate Concrete; 2nd Int. PhD Symposium in Civil Engineering, 1998 Budapest, pp. 1-8.

(Continued)

*Primary Examiner*—Paul Marcantoni
(74) *Attorney, Agent, or Firm*—Gary F. Matz

(57) ABSTRACT

A lightweight ready-mix concrete composition that contains 8-20 volume percent cement, 11-50 volume percent sand, 10-31 volume percent prepuff particles, 9-40 volume percent coarse aggregate, and 10-22 volume percent water, where the sum of components used does not exceed 100 volume percent;. The prepuff particles have an average particle diameter of from 0.2 mm to 8 mm, a bulk density of from 0.02 g/cc to 0.64 g/cc, an aspect ratio of from 1 to 3. The slump value of the composition measured according to ASTM C 143 is from 2 to 8 inches. After the lightweight ready-mix concrete composition is set for 28 days, it has a compressive strength of at least 1400 psi as tested according to ASTM C39.

13 Claims, 3 Drawing Sheets

U.S. PATENT DOCUMENTS

| | | | |
|---|---|---|---|
| 3,257,338 | A | 6/1966 | Sefton |
| 3,272,765 | A | 9/1966 | Sefton |
| 3,547,412 | A | 12/1970 | Klages et al. |
| 3,869,295 | A | 3/1975 | Bowles et al. |
| 4,026,723 | A | 5/1977 | Grof et al. |
| 4,098,877 | A | 7/1978 | Ball et al. |
| 4,265,964 | A | 5/1981 | Burkhart |
| 4,298,394 | A | 11/1981 | Leeming et al. |
| 4,303,756 | A | 12/1981 | Kajimura et al. |
| 4,303,757 | A | 12/1981 | Kajimura et al. |
| 4,412,961 | A | 11/1983 | DiBiasi et al. |
| 4,518,550 | A | 5/1985 | Miettinen et al. |
| 4,725,632 | A | 2/1988 | Vess |
| 5,069,907 | A | 12/1991 | Mixon et al. |
| 5,211,751 | A | 5/1993 | Arfaei et al. |
| 5,238,749 | A | 8/1993 | Cueman et al. |
| 5,288,480 | A | 2/1994 | Gaffar et al. |
| RE35,194 | E | 4/1996 | Gerber |
| 5,580,378 | A | 12/1996 | Shulman |
| 5,586,643 | A | 12/1996 | Zabron et al. |
| 5,622,556 | A | 4/1997 | Shulman |
| 5,643,510 | A | 7/1997 | Sucech |
| 5,725,652 | A | 3/1998 | Shulman |
| 5,853,634 | A | 12/1998 | Ontkean |
| 5,913,791 | A | 6/1999 | Baldwin |
| 6,030,446 | A | 2/2000 | Doty et al. |
| 6,033,731 | A | 3/2000 | Liebert et al. |
| 6,080,796 | A | 6/2000 | Liebert et al. |
| 6,127,439 | A | 10/2000 | Berghmans et al. |
| 6,160,027 | A | 12/2000 | Crevecoeur et al. |
| 6,242,540 | B1 | 6/2001 | Crevecoeur et al. |
| 6,800,129 | B2 | 10/2004 | Jardine et al. |
| 6,833,188 | B2 | 12/2004 | Semmens |
| 6,851,235 | B2 | 2/2005 | Baldwin |
| 6,908,949 | B2 | 6/2005 | Arch et al. |
| 6,969,423 | B2 | 11/2005 | Li et al. |
| 2002/0117769 | A1 | 8/2002 | Arch et al. |
| 2004/0065034 | A1 | 4/2004 | Messenger et al. |
| 2004/0231916 | A1 | 11/2004 | Englert et al. |
| 2006/0217464 | A1 | 9/2006 | Guevara et al. |
| 2006/0225618 | A1 | 10/2006 | Guevara et al. |
| 2007/0062415 | A1 | 3/2007 | Guevara et al. |

OTHER PUBLICATIONS

The Use of Styrocell B Beads in Cellular Bricks, Plaster and Lightweight Concrete; Shell Chemicals Europe, Styrocell Bulletin, STY 1.4, Issued Mar. 1998, 1st Edition, pp. 1-8.

Sabaa, B.A., and Sri Ravindrarajah, R., "Controlling freeze and thaw durability of structural grade concrete with recycled expanded polystyrene aggregate", Proceedings of the Second International Symposium on Structural Lightweight Aggregate Concrete, Jun. 18-22, 2000, Kristiansand, Norway, pp. 709-718.

Sri Ravindrarajah, R. and Tuck, A.J., "Properties of polystyrene aggregate concrete", Proc. of the 13th Australasian Conf. on the Mechanics of Structures & Materials, Jul. 5-6, 1993, Wollongong, Australia, pp. 705-712.

Sri Ravindrarajah, R. and Tuck, A.J., "Properties of Hardened Concrete Containing Treated Expanded Polystyrene Beads", Int. J. of Cement Composites, V 16, Dec. 1994, pp. 273-277.

Sri Ravindrarajah, R. and Sivapathasundaram, P., "Properties of Polystyrene Aggregate Concrete Having the Densities of 1300 and 1900 kg/m3", Journal of the Australian Ceramic Society, 1998, pp. 217-222.

Sri Ravindrarajah, R., "Bearing Strength of Concrete Containing Polystyrene Aggregate", Proceedings of the 8th RILEM Conference of the Durability of Building Materials & Components, Vancouver, Canada, 1999, pp. 505-514.

Sabaa, B.A., and Sri Ravindrarajah, R., "Investigation of Pull-Out Strength Between Polystyrene Aggregate Concrete and Reinforcing Steel", Proceedings of the Second International Symposium on Structural Lightweight Aggregate Concrete, Jun. 18-22, 2000, Kristiansand, Norway, pp. 729-736.

Sabaa, B.A., and Sri Ravindrarajah, R., "Impact Resistance of Polystyrene Aggregate Concrete With and Without Polypropylene Fibres", Proceedings of the Second International Symposium on Structural Lightweight Aggregate Concrete, Jun. 18-22, 2000, Kristiansand, Norway, pp. 719-728.

Naji, B. Sri Ravindrarajah, R. and Chung, H.W., "Flexural Behaviour of Ferrocement-Polystyrene Aggregate Concrete Composites", Proc. of the First Australasian Congress on Applied Mechanics, Feb. 21-23, 1996, Melbourne, Australia, pp. 351-356.

Naji, B., Sri Ravindrarajah, R. and Chung, H.W., "Impact-Echo Response in Ferrocement-Polystyrene Beaded Concrete Laminates", Proc. of the Int. Symp. On Non-Destructive Testing in Civil Engineering, Sep. 26-28, 1995, Berlin, Germany, pp. 503-511.

Sri Ravindrarajah, R. and Sivakumar, R., "Effect of Polystyrene Particle Shape on the Properties of Lightweight Aggregate Concrete", Proceedings of the South African Conference on Polymers in Concrete, Jul. 2000, Kruger National Park, South Africa, pp. 195-203.

Sabaa, B.A., and Sri Ravindrarajah, R., "Compressive and Tensile Strength of "Adjusted Density" Concrete Using Expanded Polystyrene Aggregate", Proceedings of the South African Conference on Polymers in Concrete, Jul. 2000, Kruger National Park, South Africa, pp. 133-141.

LIGHTWEIGHT CONCRETE COMPOSITIONS

REFERENCE TO RELATED APPLICATION

This application is a continuation of U.S. Application Ser. No. 11/586,120 filed Oct. 25, 2006, issued as U.S. Pat. No. 7,658,797 and entitled "Lightweight Concrete Compositions," which is a Continuation-In-Part of Application Ser. No. 11/387,198 filed Mar. 22, 2006, issued as U.S. Pat. No. 7,644,548 entitled "Lightweight Concrete Compositions", which claims the benefit of priority of U.S. Provisional Application Ser. Nos. 60/664,230 filed Mar. 22, 2005 entitled "Light Weight Concrete Composite Using EPS Beads" and 60/686,858 filed Jun. 2, 2005 entitled "Lightweight Compositions and Materials," which are all herein incorporated by reference in their entirety.

BACKGROUND OF THE INVENTION

1. Field of the Invention

The present invention is directed to novel compositions, materials, methods of their use and methods of their manufacture that are generally useful as agents in the construction and building trades. More specifically, the compounds of the present invention can be used in construction and building applications that benefit from a relatively lightweight, extendable, moldable, pourable, material that has high strength and often improved insulation properties.

2. Description of the Prior Art

In the field of preparation and use of lightweight cementitious materials, such as so-called lightweight concrete, the materials that have been available to the trades up until now have generally required the addition of various constituents to achieve a strong but lightweight concrete mass that has a high homogeneity of constituents and which is uniformly bonded throughout the mass.

U.S. Pat. Nos. 3,214,393, 3,257,338 and 3,272,765 disclose concrete mixtures that contain cement, a primary aggregate, particulate expanded styrene polymer, and a homogenizing and/or a surface-active additive.

U.S. Pat. No. 3,021,291 discloses a method of making cellular concrete by incorporating into the concrete mixture, prior to casting the mixture, a polymeric material that will expand under the influence of heat during curing. The shape and size of the polymeric particles is not critical. U.S. Pat. No. 5,580,378 discloses a lightweight cementitious product made up of an aqueous cementitious mixture that can include fly ash, Portland cement, sand, lime and, as a weight saving component, micronized polystyrene particles having particle sizes in the range of 50 to 2000 μm and a density of about 1 lb/ft$^3$. The mixture can be poured into molded products such as foundation walls, roof tiles, bricks and the like. The product can also be used as a mason's mortar, a plaster, a stucco or a texture.

JP 9 071 449 discloses a lightweight concrete that includes Portland cement and a lightweight aggregate such as foamed polystyrene, perlite or vermiculite as a part or all parts of the aggregate. The foamed polystyrene has a granule diameter of 0.1-10 mm and a specific gravity of 0.01-0.08.

U.S. Pat. Nos. 5,580,378, 5,622,556, and 5,725,652 disclose lightweight cementitious products made up of an aqueous cementitious mixture that includes cement and expanded shale, clay, slate, fly ash, and/or lime, and a weight saving component, which is micronized polystyrene particles having particle sizes in the range of 50 to 2000 μm, and characterized by having water contents in the range of from about 0.5% to 50% v/v.

U.S. Pat. No. 4,265,964 discloses lightweight compositions for structural units such as wallboard panels and the like, which contain low density expandable thermoplastic granules; a cementitious base material, such as, gypsum; a surfactant; an additive which acts as a frothing agent to incorporate an appropriate amount of air into the mixture; a film forming component; and a starch. The expandable thermoplastic granules are expanded as fully as possible.

WO 98 02 397 discloses lightweight-concrete roofing tiles made by molding a hydraulic binder composition containing synthetic resin foams as the aggregate and having a specific gravity of about 1.6 to 2.

WO 00/61519 discloses a lightweight concrete that includes a blend of from around 40% to 99% of organic polymeric material and from 1% to around 60% of an air entraining agent. The blend is used for preparing lightweight concrete that uses polystyrene aggregate. The blend is required to disperse the polystyrene aggregate and to improve the bond between the polystyrene aggregate and surrounding cementitious binder.

WO 01/66485 discloses a lightweight cementitious mixture containing by volume: 5 to 80% cement, 10 to 65% expanded polystyrene particles; 10 to 90% expanded mineral particles; and water sufficient to make a paste with a substantially even distribution of expanded polystyrene after proper mixing.

U.S. Pat. No. 6,851,235 discloses a building block that includes a mixture of water, cement, and expanded polystyrene (EPS) foam beads that have a diameter from 3.18 mm (1/8 inch) to 9.53 mm (3/8 inch) in the proportions of from 68 to 95 liters (18 to 25 gallons) water; from 150 to 190 kg (325 to 425 lb) cement; and from 850 to 1400 liters (30 to 50 cubic feet) Prepuff beads.

U.S. Pat. No. 5,913,791 discloses a building block that has a cement-based attachment layer on one or both exterior surfaces of the block that receives and holds a penetrating fastener such as a nail, screw, staple, or the like. One cement-based layer contains water, cement, and expanded polystyrene foam beads in first proportions and a second exterior surface contains water, cement, and expanded polystyrene foam beads in second proportions different than the first proportions.

Generally, the prior art recognizes the utility of using expanded polymers, in some form, in concrete compositions, to reduce the overall weight of the compositions. The expanded polymers are primarily added to take up space and create voids in the concrete and the amount of "air space" in the expanded polymer is typically maximized to achieve this objective. Generally, the prior art assumes that expanded polymer particles will lower the strength and/or structural integrity of lightweight concrete compositions. Further, concrete articles made from prior art lightweight concrete compositions have at best inconsistent physical properties, such as Young's modulus, thermal conductivity, and compressive strength, and typically demonstrate less than desirable physical properties.

Therefore, there is a need in the art for lightweight concrete compositions that provide lightweight concrete articles having predictable and desirable physical properties that overcome the above-described problems.

SUMMARY OF THE INVENTION

The present invention provides a lightweight ready-mix concrete composition that contains 8-20 volume percent cement, 11-50 volume percent sand, 10-31 volume percent prepuff particles, 9-40 volume percent coarse aggregate, and 10-22 volume percent water, where the sum of components used does not exceed 100 volume percent;. The prepuff particles have an average particle diameter of from 0.2 mm to 8 mm, a bulk density of from 0.02 g/cc to 0.64 g/cc, an aspect ratio of from 1 to 3. The slump value of the composition measured according to ASTM C 143 is from 2 to 8 inches. After the lightweight ready-mix concrete composition is set for 28 days, it has a compressive strength of at least 1400 psi as tested according to ASTM C39.

DETAILED DESCRIPTION OF THE INVENTION

Figure 2:
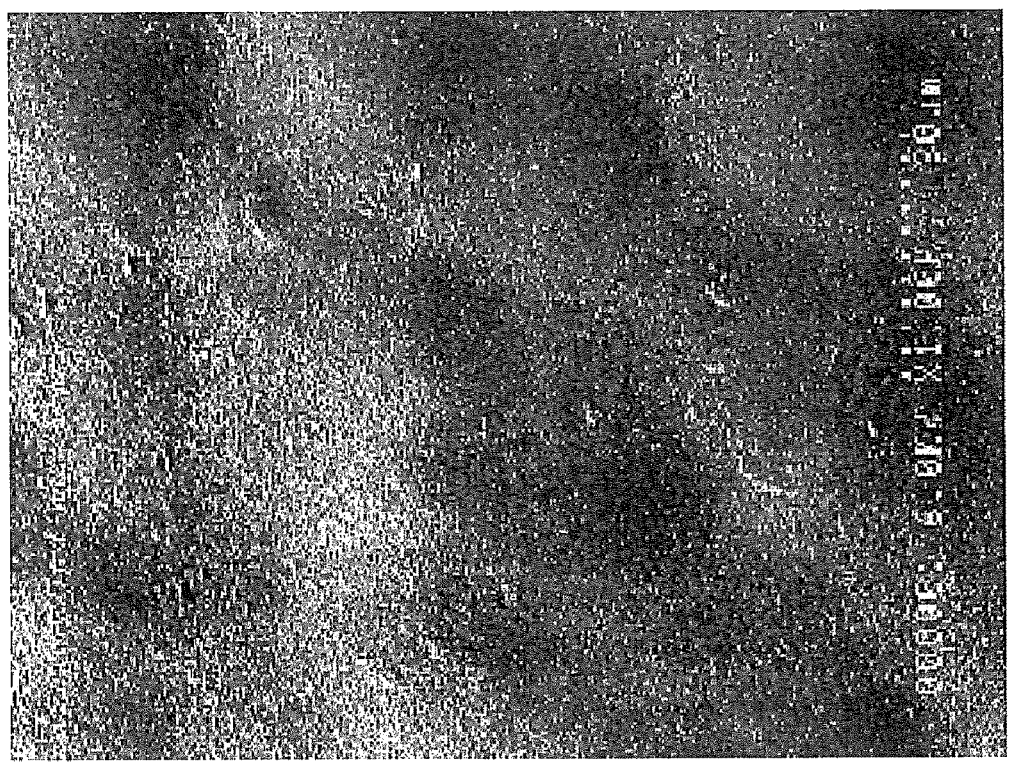
FIG. 2 is a scanning electron micrograph of the interior of a prepuff bead used in the invention.

Other than in the operating examples or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein, the term "particles containing void spaces" refer to expanded polymer particles, prepuff particles, and other particles that include cellular and/or honeycomb-type chambers at least some of which are completely enclosed, that contain air or a specific gas or combination of gasses, as a non-limiting example prepuff particles as described herein.

As used herein the terms "cement" and "cementitious" refer to materials that bond a concrete or other monolithic product, not the final product itself. In particular, hydraulic cement refers to a material that sets and hardens by undergoing a hydration reaction in the presence of a sufficient quantity of water to produce a final hardened product.

As used herein, the term "cementitious mixture" refers to a composition that includes a cement material, and one or more fillers, adjuvants, or other aggregates and/or materials known in the art that form a slurry that hardens upon curing. Cement materials include, but are not limited to, hydraulic cement, gypsum, gypsum compositions, lime and the like and may or may not include water. Adjuvants and fillers include, but are not limited to sand, clay, fly ash, aggregate, air entrainment agents, colorants, water reducers/superplasticizers, and the like.

As used herein, the term "concrete" refers to a hard strong building material made by mixing a cementitious mixture with sufficient water to cause the cementitious mixture to set and bind the entire mass.

As used herein, the term "ready mix" refers to concrete that is batched for delivery from a central plant instead of being mixed on a job site. Typically, a batch of ready mix is tailor-made according to the specifics of a particular construction project and delivered in a plastic condition, usually in cylindrical trucks often referred to as "cement mixers."

As used herein, all volume and weight percentages anticipate the use of a certain volume or weight of water. The particular amounts when referring to a dry-mix or ready-mix composition would be in the same proportions anticipating that the commensurate amount of water will be added to the dry-mix or ready-mix when it is to be finally formulated, mixed and otherwise readied for use.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

As used herein, the terms "(meth)acrylic" and "(meth) acrylate" are meant to include both acrylic and methacrylic acid derivatives, such as the corresponding alkyl esters often referred to as acrylates and (meth)acrylates, which the term "(meth)acrylate" is meant to encompass.

As used herein, the term "polymer" is meant to encompass, without limitation, homopolymers, copolymers, graft copolymers, and blends and combinations thereof.

In its broadest context, the present invention provides a method of controlling air entrainment in a formed article. The formed article can be made from any formable material, where particles containing void spaces are used to entrain air in a structurally supportive manner. Any suitable formable material can be used, so long as the particles containing void spaces are not damaged during the forming process.

As used herein, the term "composite material" refers to a solid material which includes two or more substances having different physical characteristics and in which each substance retains its identity while contributing desirable properties to the whole. As a non-limiting example, composite materials can include concrete within which prepuff beads are uniformly dispersed and embedded.

Thus, the present invention is directed to methods of controlling air entrainment where an article is formed by combining a formable material and particles containing void spaces to provide a mixture and placing the mixture in a form.

Although the application discloses in detail cementitious mixtures with polymer particles, the concepts and embodiments described herein can be applied by those skilled in the art to the other applications described above.

Embodiments of the present invention are directed to lightweight concrete (LWC) compositions that includes a cementitious mixture and polymer particles. Surprisingly, it has been found that the size, composition, structure, and physical properties of the expanded polymer particles, and in some instances their resin bead precursors, can greatly affect the physical properties of LWC articles made from the LWC compositions of the invention. Of particular note is the relationship between bead size and expanded polymer particle density on the physical properties of the resulting LWC articles.

In an embodiment of the invention, the cementitious mixture can be an aqueous cementitious mixture.

The polymer particles, which can optionally be expanded polymer particles, are present in the LWC composition at a level of at least 10, in some instances at least 15, and in other instances at least 20 volume percent and up to 90, in some cases up to 75, in other cases up to 60, in some instances up to 50, in other instance up to 40, in particular instances up to 35, and in some cases up to 31 volume percent based on the total volume of the LWC composition. The amount of polymer will vary depending on the particular physical properties desired in a finished LWC article. The amount of polymer particles in the LWC composition can be any value or can range between any of the values recited above.

The polymer particles can include any particles derived from any suitable expandable thermoplastic material. The actual polymer particles are selected based on the particular physical properties desired in a finished LWC article. As a non-limiting example, the polymer particles, which can optionally be expanded polymer particles, can include one or more polymers selected from homopolymers of vinyl aromatic monomers; copolymers of at least one vinyl aromatic monomer with one or more of divinylbenzene, conjugated dienes, alkyl methacrylates, alkyl acrylates, acrylonitrile, and/or maleic anhydride; polyolefins; polycarbonates; polyesters; polyamides; natural rubbers; synthetic rubbers; and combinations thereof.

In an embodiment of the invention, the polymer particles include thermoplastic homopolymers or copolymers selected from homopolymers derived from vinyl aromatic monomers including styrene, isopropylstyrene, alpha-methylstyrene, nuclear methylstyrenes, chlorostyrene, ten-butylstyrene, and the like, as well as copolymers prepared by the copolymerization of at least one vinyl aromatic monomer as described above with one or more other monomers, non-limiting examples being divinylbenzene, conjugated dienes (non-limiting examples being butadiene, isoprene, 1,3- and 2,4-hexadiene), alkyl methacrylates, alkyl acrylates, acrylonitrile, and maleic anhydride, wherein the vinyl aromatic monomer is present in at least 50% by weight of the copolymer. In an embodiment of the invention, styrenic polymers are used, particularly polystyrene. However, other suitable polymers can be used, such as polyolefins (e.g., polyethylene, polypropylene), polycarbonates, polyphenylene oxides, and mixtures thereof.

In a particular embodiment of the invention, the polymer particles are expandable polystyrene (EPS) particles. These particles can be in the form of beads, granules, or other particles convenient for expansion and molding operations.

In the present invention, particles polymerized in a suspension process, which are essentially spherical resin beads, are useful as polymer particles or for making expanded polymer particles. However, polymers derived from solution and bulk polymerization techniques that are extruded and cut into particle sized resin bead sections can also be used.

In an embodiment of the invention, resin beads (unexpanded) containing any of the polymers or polymer compositions described herein have a particle size of at least 0.2, in some situations at least 0.33, in some cases at least 0.35, in other cases at least 0.4, in some instances at least 0.45 and in other instances at least 0.5 mm. Also, the resin beads can have a particle size of up to 3, in some instances up to 2, in other instances up to 2.5, in some cases up to 2.25, in other cases up to 2, in some situations up to 1.5 and in other situations up to 1 mm. In this embodiment, the physical properties of LWC articles, made according to the invention, have inconsistent or undesirable physical properties when resin beads having particle sizes outside of the above described ranges are used to make the expanded polymer particles. The resin beads used in this embodiment can be any value or can range between any of the values recited above.

The expandable thermoplastic particles or resin beads can optionally be impregnated using any conventional method with a suitable blowing agent. As a non-limiting example, the impregnation can be achieved by adding the blowing agent to the aqueous suspension during the polymerization of the polymer, or alternatively by re-suspending the polymer particles in an aqueous medium and then incorporating the blowing agent as taught in U.S. Pat. No. 2,983,692. Any gaseous material or material which will produce gases on heating can be used as the blowing agent. Conventional blowing agents include aliphatic hydrocarbons containing 4 to 6 carbon atoms in the molecule, such as butanes, pentanes, hexanes, and the halogenated hydrocarbons, e.g., CFC's and HCFC's, which boil at a temperature below the softening point of the polymer chosen. Mixtures of these aliphatic hydrocarbon blowing agents can also be used.

Alternatively, water can be blended with these aliphatic hydrocarbon blowing agents or water can be used as the sole blowing agent as taught in U.S. Pat. Nos. 6,127,439; 6,160,027; and 6,242,540; in these patents, water-retaining agents are used. The weight percentage of water for use as the blowing agent can range from 1 to 20%. The texts of U.S. Pat. Nos. 6,127,439, 6,160,027 and 6,242,540 are incorporated herein by reference.

The impregnated polymer particles or resin beads are optionally expanded to a bulk density of at least 1.25 lb/ft$^3$ (0.02 g/cc), in some cases 1.75 lb/ft$^3$ (0.028 g/cc), in some circumstances, at least 2 lb/ft$^3$ (0.032 g/cc) in other circumstances at least 3 lb/ft$^3$ (0.048 g/cc) and in particular circumstances at least 3.25 lb/ft$^3$ (0.052 g/cc) or 3.5 lb/ft$^3$ (0.056 g/cc). When non-expanded resin beads are used, higher bulk density beads can be used. As such, the bulk density can be as high as 40 lb/ft$^3$ (0.64 g/cc). In other situations, the polymer particles are at least partially expanded and the bulk density can be up to 35 lb/ft$^3$ (0.56 g/cc), in some cases up to 30 lb/ft$^3$ (0.48 g/cc), in other cases up to 25 lb/ft$^3$ (0.4 g/cc), in some instances up to 20 lb/ft$^3$ (0.32 g/cc), in other instances up to 15 lb/ft$^3$ (0.24 g/cc) and in certain circumstances up to 10 lb/ft$^3$ (0.16 g/cc). The bulk density of the polymer particles can be any value or range between any of the values recited above. The bulk density of the polymer particles, resin beads and/or prepuff particles is determined by weighing a known volume of polymer particles, beads and/or prepuff particles (aged 24 hours at ambient conditions).

The expansion step is conventionally carried out by heating the impregnated beads via any conventional heating medium, such as steam, hot air, hot water, or radiant heat. One generally accepted method for accomplishing the pre-expansion of impregnated thermoplastic particles is taught in U.S. Pat. No. 3,023,175.

The impregnated polymer particles can be foamed cellular polymer particles as taught in U.S. Published Application No. 2002-0117769 A1, the teachings of which are incorporated herein by reference. The foamed cellular particles can be polystyrene that are expanded and contain a volatile blowing agent at a level of less than 14 wt. %, in some situations less than 6 wt. %, in some cases ranging from about 2 wt. % to about 5 wt. %, and in other cases ranging from about 2.5 wt. % to about 3.5 wt. % based on the weight of the polymer.

An interpolymer of a polyolefin and in situ polymerized vinyl aromatic monomers that can be included in the expanded thermoplastic resin or polymer particles according to the invention is disclosed in U.S. Pat. Nos. 4,303,756, 4,303,757 and 6,908,949, the relevant portions of which are herein incorporated by reference.

The polymer particles can include customary ingredients and additives, such as flame retardants, pigments, dyes, colorants, plasticizers, mold release agents, stabilizers, ultraviolet light absorbers, mold prevention agents, antioxidants, rodenticides, insect repellants, and so on. Typical pigments include, without limitation, inorganic pigments such as carbon black, graphite, expandable graphite, zinc oxide, titanium dioxide, and iron oxide, as well as organic pigments such as quinacridone reds and violets and copper phthalocyanine blues and greens.

In a particular embodiment of the invention, the pigment is carbon black, a non-limiting example of such a material being EPS SILVER®, available from NOVA Chemicals Inc.

In another particular embodiment of the invention, the pigment is graphite, a non-limiting example of such a material being NEOPOR®, available from BASF Aktiengesellschaft Corp., Ludwigshafen am Rhein, Germany.

When materials such as carbon black and/or graphite are included in the polymer particles, improved insulating properties, as exemplified by higher R values for materials containing carbon black or graphite (as determined using ASTM-C518), are provided. As such, the R value of the expanded polymer particles containing carbon black and/or graphite or materials made from such polymer particles are at least 5% higher than observed for particles or resulting articles that do not contain carbon black and/or graphite.

The expanded polymer particles or prepuff particles can have an average particle size of at least 0.2, in some circumstances at least 0.3, in other circumstances at least 0.5, in some cases at least 0.75, in other cases at least 0.9 and in some instances at least 1 mm and can be up to 8, in some circumstances up to 6, in other circumstances up to 5, in some cases up to 4, in other cases up to 3, and in some instances up to 2.5 mm. When the size of the expanded polymer particles or prepuff particles are too small or too large, the physical properties of LWC articles made using the present LWC composition can be undesirable. The average particle size of the expanded polymer particles or prepuff particles can be any value and can range between any of the values recited above.

The average particle size of the expanded polymer particles or prepuff particles can be determined using laser diffraction techniques or by screening according to mesh size using mechanical separation methods well known in the art.

In an embodiment of the invention, the polymer particles or expanded polymer particles have a minimum average cell wall thickness, which helps to provide desirable physical properties to LWC articles made using the present LWC composition. The average cell wall thickness and inner cellular dimensions can be determined using scanning electron microscopy techniques known in the art. The expanded polymer particles can have an average cell wall thickness of at least 0.15 µm, in some cases at least 0.2 µm and in other cases at least 0.25 µm. Not wishing to be bound to any particular theory, it is believed that a desirable average cell wall thickness results when resin beads having the above-described dimensions are expanded to the above-described densities.

In an embodiment of the invention, the polymer beads are optionally expanded to form the expanded polymer particles such that a desirable cell wall thickness as described above is achieved. Though many variables can impact the wall thickness, it is desirable, in this embodiment, to limit the expansion of the polymer bead so as to achieve a desired wall thickness and resulting expanded polymer particle strength. Optimizing processing steps and blowing agents can expand the polymer beads to a minimum of 1.25 lb/ft³ (0.02 g/cc). This property of the expanded polymer bulk density, can be described by pcf (lb/ft³) or by an expansion factor (cc/g).

As used herein, the term "expansion factor" refers to the volume a given weight of expanded polymer bead occupies, typically expressed as cc/g, and in the present invention, typically a value up to 50 cc/g.

In order to provide expanded polymer particles with desirable cell wall thickness and strength, the expanded polymer particles are not expanded to their maximum expansion factor; as such, an extreme expansion yields particles with undesirably thin cell walls and insufficient strength. Further, the polymer beads can be expanded at least 5%, in some cases at least 10%, and in other cases at least 15% of their maximum expansion factor. However, so as not to cause the cell wall thickness to be too thin, the polymer beads are expanded up to 80%, in some cases up to 75%, in other cases up to 70%, in some instances up to 65%, in other instances up to 60%, in some circumstances up to 55%, and in other circumstances up to 50% of their maximum expansion factor. The polymer beads can be expanded to any degree indicated above or the expansion can range between any of the values recited above. Typically, the polymer beads or prepuff particles do not further expand when formulated into the present cementitious compositions and do not further expand while the cementitious compositions set, cure and/or harden.

As used herein, the term "prepuff" refers to an expandable particle, resin and/or bead that has been expanded, but has not been expanded to its maximum expansion factor.

In embodiments of the invention, the prepuff particles can have an expansion factor of at least 10 and in some cases at least 12 cc/g and can be up to 70, in some cases up to 60 cc/g and in other cases up to 50 cc/g. The expansion factor of the prepuff particles can be any value or range between any of the values recited above.

Figure 1:
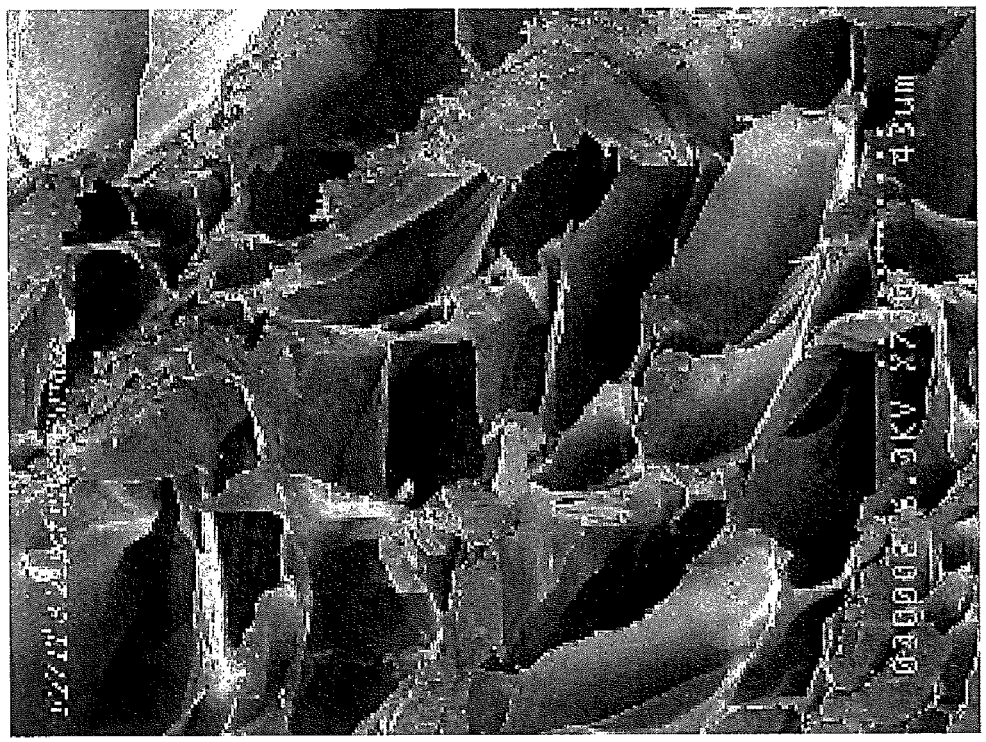
FIG. 1 is a scanning electron micrograph of the surface of a prepuff bead used in the invention.
Figure 4:
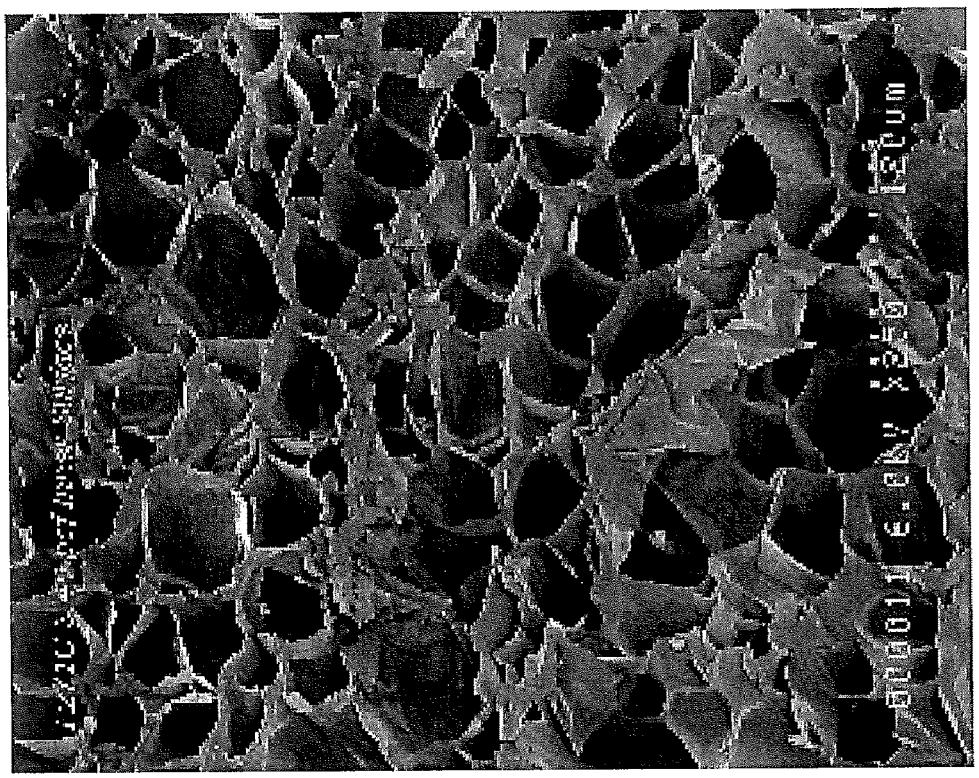
FIG. 4 is a scanning electron micrograph of the interior of a prepuff bead used in the invention.
Figure 3:
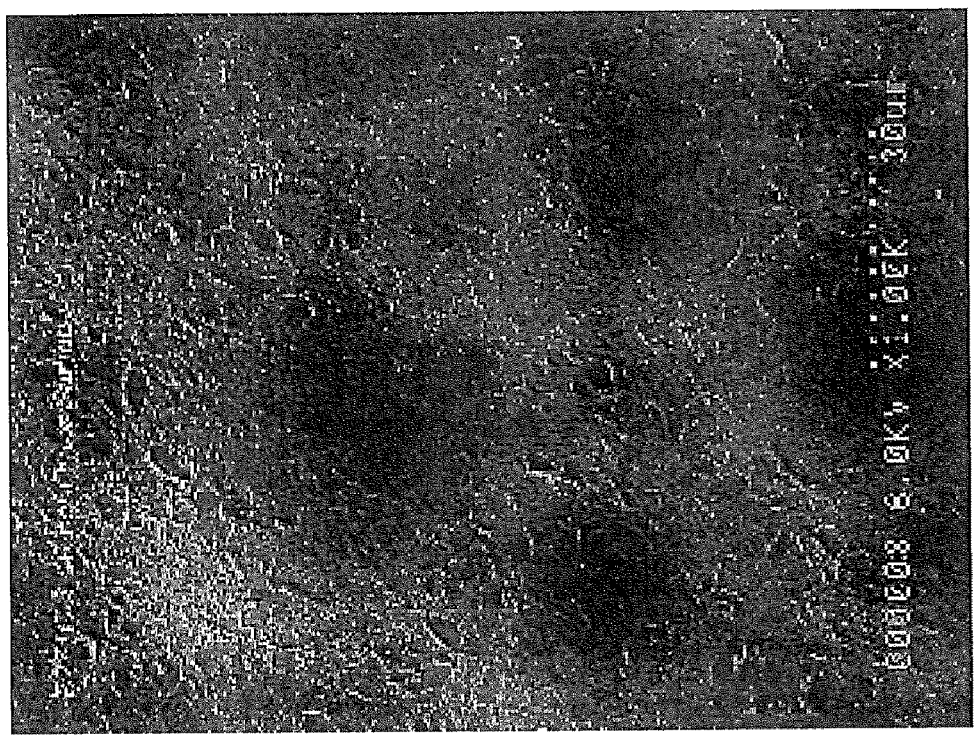
FIG. 3 is a scanning electron micrograph of the surface of a prepuff bead used in the invention.
Figure 6:
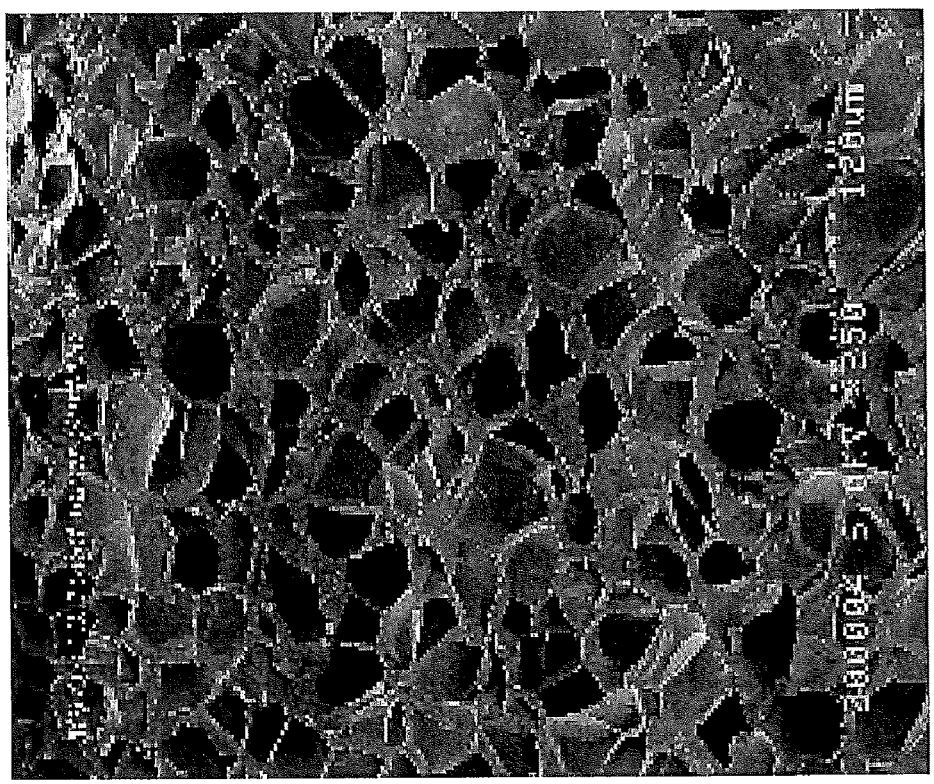
FIG. 6 is a scanning electron micrograph of the interior of a prepuff bead used in the invention.
Figure 5:
FIG. 5 is a scanning electron micrograph of the surface of a prepuff bead used in the invention.

The prepuff or expanded polymer particles typically have a cellular structure or honeycomb interior portion and a generally smooth continuous polymeric surface as an outer surface, i.e., a substantially continuous outer layer. The smooth continuous surface can be observed using scanning electron microscope (SEM) techniques at 1000× magnification. SEM observations do not indicate the presence of holes in the outer surface of the prepuff or expanded polymer particles, as shown in FIGS. 1, 3 and 5. Cutting sections of the prepuff or expanded polymer particles and taking SEM observations reveals the generally honeycomb structure of the interior of the prepuff or expanded polymer particles, as shown in FIGS. 2, 4 and 6.

The polymer particles or expanded polymer particles can have any cross-sectional shape that allows for providing desirable physical properties in LWC articles. In an embodiment of the invention, the expanded polymer particles have a circular, oval or elliptical cross-section shape. In embodiments of the invention, the prepuff or expanded polymer particles have an aspect ratio of 1, in some cases at least 1 and the aspect ratio can be up to 3, in some cases up to 2 and in other cases up to 1.5. The aspect ratio of the prepuff or expanded polymer particles can be any value or range between any of the values recited above.

The cementitious mixture is present in the LWC composition at a level of at least 10, in some instances at least 15, in other instances at least 22, in some cases at least 40 and in other cases at least 50 volume percent and can be present at a level of up to 90, in some circumstances up to 85, in other circumstances up to 80, in particular cases up to 75, in some cases up to 70, in other cases up to 65, and in some instances up to 60 volume percent of the LWC composition. The cementitious mixture can be present in the LWC composition at any level stated above and can range between any of the levels stated above.

In an embodiment of the invention, the cementitious mixture includes a hydraulic cement composition. The hydraulic cement composition can be present at a level of at least 3, in certain situations at least 5, in some cases at least 8, and in other cases at least 9 volume percent and can be' present at levels up to 40, in some cases up to 35, in other cases up to 30, and in some instances up to 20 volume percent of the cementitious mixture. The cementitious mixture can include the hydraulic cement composition at any of the above-stated levels or at levels ranging between any of levels stated above.

In a particular embodiment of the invention, the hydraulic cement composition can be one or more materials selected from Portland cements, pozzolana cements, gypsum cements, aluminous cements, magnesia cements, silica cements, and slag cements. Further, various cement types as defined in ASTM C150 can be used in the invention, non-limiting examples of which include Type I (for use when the special properties of other cement types are not required), Type IA (for air-entraining cement of Type I quality), Type II (for general use when moderate sulfate resistance or moderate heat of hydration is desired), Type IIA (for air-entraining cement of Type II quality), Type III (for use when high early strength is desired), Type IIIA (for air-entraining cement of Type III quality), and Type IV (for use when a low heat of hydration is desired), Type V (for use when high sulfate resistance is desired).

In a particular embodiment of the invention the cement composition is type I Portland cement.

In an embodiment of the invention, the cementitious mixture can optionally include other aggregates and adjuvants known in the art including but not limited to sand, additional aggregate, plasticizers and/or fibers. Suitable fibers include, but are not limited to glass fibers, silicon carbide, aramid fibers, polyester, carbon fibers, composite fibers, fiberglass, and combinations thereof, as well as fabric containing the above-mentioned fibers, and fabric containing combinations of the above-mentioned fibers.

Non-limiting examples of fibers that can be used in the invention include MeC-GRID® and C-GRID® available from TechFab, LLC, Anderson, S.C.; KEVLAR® available from E.I. du Pont de Nemours and Company, Wilmington Del.; TWARON® available from Teijin Twaron B.V., Arnheim, The Netherlands; SPECTRA® available from Honeywell International Inc., Morristown, N.J.; DACRON® available from Invista North America S.A.R.L. Corp. Wilmington, Del.; and VECTRAN® available from Hoechst Cellanese Corp., New York, N.Y. The fibers can be used in a mesh structure, intertwined, interwoven, and oriented in any desirable direction.

In a particular embodiment of the invention, fibers can make up at least 0.1, in some cases at least 0.5, in other cases at least 1, and in some instances at least 2 volume percent of the LWC composition. Further, fibers can provide up to 10, in some cases up to 8, in other cases up to 7, and in some instances up to 5 volume percent of the LWC composition. The amount of fibers is adjusted to provide desired properties to the LWC composition. The amount of fibers can be any value or range between any of the values recited above.

Further to this embodiment, the additional aggregate can include, but is not limited to, one or more materials selected from common aggregates such as sand, stone, and gravel. Common lightweight aggregates can include ground granulated blast furnace slag, fly ash, glass, silica, expanded slate and clay; insulating aggregates such as pumice, perlite, vermiculite, scoria, and diatomite; LWC aggregate such as expanded shale, expanded slate, expanded clay, expanded slag, fumed silica, pelletized aggregate, extruded fly ash, tuff, and macrolite; and masonry aggregate such as expanded shale, clay, slate, expanded blast furnace slag, sintered fly ash, coal cinders, pumice, scoria, and pelletized aggregate.

As non-limiting examples, stone can include river rock, limestone, granite, sandstone, brownstone, conglomerate, calcite, dolomite, serpentine, travertine, slate, bluestone, gneiss, quarizitic sandstone, quartzite and combinations thereof.

When included, the other aggregates and adjuvants are present in the cementitious mixture at a level of at least 0.5, in some cases at least 1, in other cases at least 2.5, in some instances at least 5 and in other instances at least 10 volume percent of the cementitious mixture. Also, the other aggregates and adjuvants can be present at a level of up to 95, in some cases up to 90, in other cases up to 85, in some instances up to 65 and in other instances up to 60 volume percent of the cementitious mixture. The other aggregates and adjuvants can be present in the cementitious mixture at any of the levels indicated above or can range between any of the levels indicated above.

In a particular embodiment of the invention, sand and/or other fine aggregate can make up at least 11, in some cases at least 15, in other cases at least 20 volume percent of the LWC composition. Further, sand and/or other fine aggregate can provide up to 50, in some cases up to 45, in other cases up to 40, and in some instances up to 35 volume percent of the LWC composition. The amount of sand and/or other fine aggregate is adjusted to provide desired properties to the LWC composition. The amount of sand and/or other fine aggregate can be any value or range between any of the values recited above.

In a particular embodiment of the invention, coarse aggregate (aggregate having an FM value of greater than 4) can make up at least 1, in some cases at least 9, and in other cases at least 12 volume percent of the LWC composition. Further, coarse aggregate can provide up to 40, in some cases up to 35, in other cases up to 30, and in some instances up to 25 volume percent of the LWC composition. The amount of coarse aggregate is adjusted to provide desired properties to the LWC composition. The amount of coarse aggregate sand can be any value or range between any of the values recited above.

In embodiments of the invention, the lightweight concrete compositions can contain one or more additives, non-limiting examples of such being anti-foam agents, water-proofing agents, dispersing agents, set-accelerators, set-retarders, plasticizing agents, superplasticizing agents, water reducers, bonding agents, freezing point decreasing agents, adhesiveness-improving agents, and colorants. The additives are typically present at less than one percent by weight with respect to total weight of the composition, but can be present at from 0.1 to 3 weight percent.

Suitable dispersing agents or plasticizers that can be used in the invention include, but are not limited to, hexametaphosphate, tripolyphosphate, polynaphthalene sulphonate, sulphonated polyamine and combinations thereof.

Suitable plasticizing agents that can be used in the invention include, but are not limited to, polyhydroxycarboxylic acids or salts thereof, polycarboxylates or salts thereof; lignosulfonates, polyethylene glycols, and combinations thereof.

Suitable superplasticizing agents that can be used in the invention include, but are not limited to, alkaline or earth alkaline metal salts of lignin sulfonates; lignosulfonates, alkaline or earth alkaline metal salts of highly condensed naphthalene sulfonic acid/formaldehyde condensates; polynaphthalene sulfonates, alkaline or earth alkaline metal salts of one or more polycarboxylates (such as poly(meth)acrylates and the polycarboxylate comb copolymers described in U.S. Pat. No. 6,800,129, the relevant portions of which are herein incorporated by reference); alkaline or earth alkaline metal salts of melamine/formaldehyde/sulfite condensates; sulfonic acid esters; carbohydrate esters; and combinations thereof.

Non-limiting examples of suitable water reducers include lignosul-fonates, sodium naphthalene sulfonate formaldehyde condensates, sulfonated melamine-formaldehyde resins, sulfonated vinylcopolymers, urea resins, and salts of hydroxy- or polyhydroxy-carboxylic acids, a 90/10 w/w mixture of polymers of the sodium salt of naphthalene sulfonic acid, partially condensed with formaldehyde and sodium gluconate as described in U.S. Pat. No. 3,686,133, and combinations thereof.

Examples of suitable bonding agents include materials that can be either inorganic or organic and are soft and workable when fresh but set to form a hard, infusible solid on curing, either by hydraulic action or by chemical crosslinking. Non-limiting examples of such materials can include organic materials such as rubber, polyvinyl chloride, polyvinyl acetate, acrylics, styrene butadiene copolymers, and various powdered polymers:

Suitable set-accelerators that can be used in the invention include, but are not limited to soluble chloride salts (such as calcium chloride), triethanolamine, paraformaldehyde, soluble formate salts (such as calcium formate), sodium hydroxide, potassium hydroxide, sodium carbonate, sodium sulfate, $12CaO.7Al_2O_3$, sodium sulfate, aluminum sulfate, iron sulfate, the alkali metal nitrate/sulfonated aromatic hydrocarbon aliphatic aldehyde condensates disclosed in U.S. Pat. No. 4,026,723, the water soluble surfactant accelerators disclosed in U.S. Pat. No. 4,298,394, the methylol derivatives of amino acids accelerators disclosed in U.S. Pat. No. 5,211,751, and the mixtures of thiocyanic acid salts, alkanolamines, and nitric acid salts disclosed in U.S. Pat. No. Re. 35,194, the relevant portions of which are herein incorporated by reference, and combinations thereof.

Suitable set-retarders that can be used in the invention include, but are not limited to lignosulfonates, hydroxycarboxylic acids (such as gluconic acid, citric acid, tartaric acid, maleic acid, salicylic acid, glucoheptonic acid, arabonic acid, acid, and inorganic or organic salts thereof such as sodium, potassium, calcium, magnesium, ammonium and triethanolamine salt), cardonic acid, sugars, modified sugars, phosphates, borates, silico-fluorides, calcium bromate, calcium sulfate, sodium sulfate, monosaccharides such as glucose, fructose, galactose, saccharose, xylose, apiose, ribose and invert sugar, oligosaccharides such as disaccharides and trisaccharides, such oligosaccharides as dextrin, polysaccharides such as dextran, and other saccharides such as molasses containing these; sugar alcohols such as sorbitol; magnesium silicofluoride; phosphoric acid and salts thereof, or borate esters; aminocarboxylic acids and salts thereof; alkali-soluble proteins; humic acid; tannic acid; phenols; polyhydric alcohols such as glycerol; phosphonic acids and derivatives thereof, such as aminotri(methylene-phosphonic acid), 1-hydroxyethylidene-1,1-diphosphonic acid, ethylenediaminetetra(methylenephosphonic acid), diethylenetriamine-penta (methylenephosphonic acid), and alkali metal or alkaline earth metal salts thereof, and combinations of the set-retarders indicated above.

Suitable defoaming agents that can be used in the invention include, but are not limited to silicone-based defoaming agents (such as dimethylpolysiloxane, dimethylsilicone oil, silicone paste, silicone emulsions, organic group-modified polysiloxanes (polyorganosiloxanes such as dimethylpolysiloxane), fluorosilicone oils, etc.), alkyl phosphates (such as tributyl phosphate, sodium octylphosphate, etc.), mineral oil-based defoaming agents (such as kerosene, liquid paraffin, etc.), fat- or oil-based defoaming agents (such as animal or vegetable oils, sesame oil, castor oil, alkylene oxide adducts derived therefrom, etc.), fatty acid-based defoaming agents (such as oleic acid, stearic acid, and alkylene oxide adducts derived therefrom, etc.), fatty acid ester-based defoaming agents (such as glycerol monoricinolate, alkenylsuccinic acid derivatives, sorbitol monolaurate, sorbitol trioleate, natural waxes, etc.), oxyalkylene type defoaming agents, alcohol-based defoaming agents: octyl alcohol, hexadecyl alcohol, acetylene alcohols, glycols, etc.), amide-based defoaming agents (such as acrylate polyamines, etc.), metal salt-based defoaming agents (such as aluminum stearate, calcium oleate, etc.) and combinations of the above-described defoaming agents.

Suitable freezing point decreasing agents that can be used in the invention include, but are not limited to ethyl alcohol, calcium chloride, potassium chloride, and combinations thereof.

Suitable adhesiveness-improving agents that can be used in the invention include, but are not limited to polyvinyl acetate, styrene-butadiene, homopolymers and copolymers of (meth) acrylate esters, and combinations thereof.

Suitable water-repellent or water-proofing agents that can be used in the invention include, but are not limited to fatty acids (such as stearic acid or oleic acid), lower alkyl fatty acid esters (such as butyl stearate), fatty acid salts (such as calcium or aluminum stearate), silicones, wax emulsions, hydrocarbon resins, bitumen, fats and oils, silicones, paraffins, asphalt, waxes, and combinations thereof. Although not used in many embodiments of the invention, when used, suitable air-entraining agents include, but are not limited to, vinsol resins, sodium abietate, fatty acids and salts thereof, tensides, alkylaryl-sulfonates, phenol ethoxylates, lignosulfonates, and mixtures thereof.

The cementitious mixture, expanded polymer particles, and any other aggregates, additives and/or adjuvants are mixed using methods well known in the art. In an embodiment of the invention, a liquid, in some instances water, is also mixed into the other ingredients.

In an embodiment of the invention, a dry mixture (i.e., containing minimal or no added water) can be produced, packaged and stored for future use. Such a dry mixture can later be mixed with water to provide the lightweight concrete compositions described herein.

In an embodiment of the invention, the concrete composition is a dispersion where the cementitious mixture provides, at least in part, a continuous phase and the polymer particles and/or expanded polymer particles exist as a dispersed phase of discrete particles in the continuous phase.

As a particular and non-limiting embodiment of the invention, the concrete composition is substantially free of wetting agents or dispersing agents used to stabilize the dispersion.

As a non-limiting embodiment of the invention and as not wishing to be limited to any single theory, some factors that can affect the performance of the present LWC composition include the volume fraction of the expanded resin bead, the average expanded bead size and the microstructure created by the inter-bead spacing within the concrete. In this embodiment, the inter-bead spacing can be estimated using a two-dimensional model. For simplicity in description, the inter-bead spacing can be limited to the bead radius. Additionally, and without meaning to limit the invention in any way, it is assumed in this embodiment that the beads are arranged in a cubic lattice, bead size distribution in the LWC composition is not considered, and the distribution of expanded bead area in the cross-section is not considered. In order to calculate the number of beads per sample, a three-dimensional test cylinder is assumed.

The smaller the expanded bead size, the greater the number of expanded beads required to maintain the same expanded bead volume fraction as described by Equation 1 below. As the number of expanded beads increases exponentially, the spacing between the expanded beads decreases.

$$N_b = K/B^3 \tag{1}$$

$N_b$ represents the number of expanded beads.

A LWC test specimen with diameter D and height H (usually 2"×4" or 6"×12"), containing dispersed expanded polymer beads of average expanded bead diameter B, and a given volume fraction $V_d$ contains an amount of expanded polymer beads $N_b$ given by equation 1:

Note that $N_b$ is inversely proportional to the cube of the expanded polymer bead diameter. The constant of proportionality, $K=1.5 V_d HD^2$, is a number that is dependent only on the sample size and the volume fraction of expanded polymer beads. Thus for a given sample size, and known expanded polymer bead volume fraction, the number of beads increases to a third power as the bead diameter decreases.

As a non-limiting example, for a 2"×4" LWC specimen, at 90 pcf (lb/ft³) (corresponding to expanded polymer bead 43% volume fraction with pre-puff bulk density of 1.25 pcf), the number of beads increases fourfold and sevenfold moving from a 0.65 mm bead to 0.4 mm and 0.33 mm beads respectively. At 2.08 pcf, the increase in the number of beads is sixfold and sevenfold for 0.4 mm and 0.33 mm beads respectively. At 5 pcf, the increases are twofold and threefold respectively. Thus, the density correlates to the bead size. As shown below, the density also affects the cell wall thickness. The strength of a concrete matrix populated by expanded beads is typically affected by the cell wall stiffness and thickness.

In an embodiment of the invention, where monodisperse spherical cells are assumed, it can be shown that the mean cell diameter d is related to the mean wall thickness δ by equation 2:

$$d = \delta \bigg/ \left( \frac{1}{\sqrt{1 - \rho/\rho_s}} - 1 \right) \tag{2}$$

where $\rho$ is the density of the foam and $\rho_s$ is the density of the solid polymer bead.

Thus for a given polymer, depending on the particular expansion process used, one can obtain the same cell wall thickness (at a given cell size) or the same cell size at various values of δ. The density is controlled not only by the cell size but also by varying the thickness of the cell wall.

The table below exemplifies the variation of expanded polymer bead density with bead size for three classes of beads.

| Bead Size, microns | Density (pcf) | Foam Particle Size (mm) | Expansion factor (cc/g) | Average Number of beads for 43% volume fraction |
|---|---|---|---|---|
| 650 | 2.00 | 1.764 | 31 | 96,768 |
| 650 | 3.00 | 1.541 | 21 | 145,152 |
| 650 | 4.00 | 1.400 | 16 | 193,536 |
| 400 | 2.00 | 1.086 | 31 | 415,233 |
| 400 | 3.00 | 0.949 | 21 | 622,849 |
| 400 | 4.00 | 0.862 | 16 | 830,466 |
| 330 | 2.00 | 0.896 | 31 | 739,486 |
| 330 | 3.00 | 0.783 | 21 | 1,109,229 |
| 330 | 4.00 | 0.711 | 16 | 1,478,972 |

Desirable microstructures and/or morphologies can fall into distinct classes. The first is a bicontinous or co-continuous composite with special interfaces and the second includes special inclusions in a connected matrix. The effective properties of both bicontinous and singly connected microstructures are described by known optimal cross-property bounds.

In many cases, the smaller the beads, the greater the number of beads required to maintain the same expanded polymer bead volume fraction as described by Equation 1. As the number of beads increases exponentially, the spacing between the beads decreases.

The optimal bounds can be described by a number of relations representing critical numbers or limits. As a non-limiting example, for a given volume fraction, there is often a critical bead size corresponding to a critical number of beads that can be dispersed to provide a desired morphology such that all the beads are isolated and the concrete is singly connected. It is also possible to form a morphology where all of the beads are non-isolated but contacting.

Finite element analysis of a 2-dimensional cross section was performed using ANSYS® (a finite element analysis program available from ANSYS Inc., Canonsburg, Pa.). In the finite element mesh of the cross-section, the beads are modeled as non-contacting or isolated circles in a singly connected concrete matrix.

The results demonstrate that under loading, the stresses build up in a direction perpendicular to the load axis. The maximum stress concentrations are at the horizontal boundary between the expanded polymer beads, which tend to be deformed from a circular shape to an elliptical shape.

In a particular embodiment of the invention, the concrete composition contains at least some of the expanded polymer particles or prepuff particles arranged in a cubic or hexagonal lattice.

In an embodiment of the invention, the present LWC composition is substantially free of air entraining agents, which are typically added to create air cells or voids in a batch of concrete.

In another embodiment of the invention, the LWC composition can include reinforcement fibers. Such fibers act as reinforcing components, having a large aspect ratio, that is, their length/diameter ratio is high, so that a load is transferred across potential points of fracture. Non-limiting examples of suitable fibers include fiberglass strands of approximately one to one and three fourths inches in length, although any material can be used that has a higher Young's modulus than the matrix of the cementitious mixture, polypropylene fiber and other fibers as described above.

The LWC compositions according to the invention can be set and/or hardened to form final concrete articles using methods well known in the art.

The density of the set and/or hardened final concrete articles containing the LWC composition of the invention can be at least 40 lb/ft$^3$ (0.64 g/cc), in some cases at least 45 lb/ft$^3$ (0.72 g/cc) and in other cases at least 50 lb/ft$^3$ (0.8 g/cc) lb/ft$^3$ and the density can be up to 130 lb/ft$^3$ (2.1 g/cc), in some cases 120 lb/ft$^3$ (1.9 g/cc), in other cases up to 115 lb/ft$^3$ (1.8 g/cc), in some circumstances up to 110 lb/ft$^3$ (1.75 g/cc), in other circumstances up to 105 lb/ft$^3$ (1.7 g/cc), in some instances up to 100 lb/ft$^3$ (1.6 g/cc), and in other instances up to 95 lb/ft$^3$ (1.5 g/cc). The density of the present concrete articles can be any value and can range between any of the values recited above. The density of the LWC composition is determined according to ASTM C 138.

In a particular embodiment of the invention, the LWC composition contains from 8 to 20 volume percent of a cement composition that includes type I Portland Cement; from 10 to 31 volume percent of expanded polymer particles having an average particle diameter of from 0.2 mm to 5 mm, a bulk density of from 0.02 g/cc to 0.64 g/cc, and an aspect ratio of from 1 to 2; from 9 to 90 volume percent of one or more aggregates; and optionally from 0.1 to 1 volume percent of one or more additives selected from anti-foam agents, water-proofing agents, dispersing agents, set-accelerators, set-retarders, plasticizing agents, superplasticizing agents, freezing point decreasing agents, adhesiveness-improving agents, colorants and combinations thereof; where the sum of components used does not exceed 100 volume percent and where after the lightweight cementitious composition is set, it has a compressive strength of at least 1400 psi as tested according to ASTM C39 after 28 days.

In an embodiment of the invention, the set and/or hardened LWC compositions according to the invention are used in structural applications and can have a minimum compressive strength for load bearing masonry structural applications of at least 1400 psi (98 kgf/cm$^2$), in some cases 1700 psi (119.5 kgf/cm$^2$), in other cases at least 1800 psi (126.5 kgf/cm$^2$), in some instances at least 1900 psi, and in other instances at least 2000 psi (140.6 kgf/cm$^2$). For structural lightweight concrete, the compositions can have a minimum compressive strength of at least 2500 psi (175.8 kgf/cm$^2$). Compressive strengths are determined according to ASTM C39 at 28 days.

Although ASTM C39 can be consulted for precise details, and is incorporated by reference herein in its entirety, it can be summarized as providing a test method that consists of applying a compressive axial load to molded cylinders or cores at a rate which is within a prescribed range until failure occurs. The testing machine is equipped with two steel bearing blocks with hardened faces, one which is a spherically seated block that will bear on the upper surface of the specimen, and the other a solid block on which the specimen rests. The load is applied at a rate of movement (platen to crosshead measurement) corresponding to a stress rate on the specimen of 35±7 psi/s (0.25±0.05 Mpa/s). The compressive load is applied until the load indicator shows that the load is decreasing steadily and the specimen displays a well-defined fracture pattern. The compressive strength is calculated by dividing the maximum load carried by the specimen during the test by the cross-sectional area of the specimen.

In embodiments of the invention, the LWC compositions of the invention are used in ready mix applications. As a non-limiting example, ready mixed LWC compositions can be used when small quantities of concrete or intermittent placing of concrete are required or for large jobs where space is limited and there is little room for a mixing plant and aggregate stockpiles.

As non-limiting examples, ready mix can include central-mixed concrete, transit-mixed concrete, and shrink-mixed concrete.

Central-mixed concrete is completely mixed at a plant and then transported in a truck-mixer or agitator truck. Freshly mixed LWC compositions can be transported in an open dump truck if the jobsite is near the plant. Slight agitation of the concrete during transit prevents segregation of the materials and reduces the amount of slump loss.

In transit-mixed (also known as truck-mixed) concrete, materials are batched at a central plant and are completely mixed in the truck in transit. Frequently, the LWC composition is partially mixed in transit and mixing is completed at the jobsite. Transit-mixing keeps the water separate from the cement and aggregates and allows the concrete to be mixed immediately before placement at the construction site. This method avoids the problems of premature hardening and slump loss that result from potential delays in transportation or placement of central-mixed concrete. Additionally, transit-mixing allows concrete to be hauled to construction sites further away from the plant. A disadvantage to transit-mixed concrete, however, is that the truck capacity is smaller than that of the same truck containing central-mixed concrete.

Shrink-mixed concrete is used to increase the truck's load capacity and retain the advantages of transit-mixed concrete. In shrink-mixed concrete, the LWC composition is partially mixed at the plant to reduce or shrink the volume of the mixture and mixing is completed in transit or at the jobsite.

Ready mixed concrete is often remixed once it arrives at the jobsite to ensure that the proper slump is obtained. However, concrete that has been remixed tends to set more rapidly than concrete mixed only once. Materials, such as water and some varieties of admixtures, are often added to the LWC composition at the jobsite after it has been batched to ensure that the specified properties are attained before placement.

The LWC concrete ready mix compositions of the invention are often designed for specific applications. As non-limiting examples, a high slump LWC concrete ready mix composition can be desirable when the concrete must be placed around a high concentration of reinforcing steel. Also, a low slump LWC concrete ready mix composition can be desirable when concrete is placed in large open forms, or when the form is placed on a slope.

As such, in some embodiments of the invention, the LWC ready mix compositions will have a measurable slump value, sampled according to ASTM C 172 (Standard Practice for Sampling Freshly Mixed Concrete) and measured according to ASTM C 143 (Standard Test Method for Slump of Hydraulic Cement Concrete). The exact slump value is designed into a particular mix and will depend on the application and the design of the LWC ready mix composition. In typical use, the slump will range from at least about 2 inches (5 cm) and in some cases at least about 3 inches (7.6 cm) to up to about 8 inches (20 cm), in some cases up to about 7 inches (18 cm) and in other cases up to about 6 inches (15 cm). If the concrete delivered to a project is too stiff (low slump) it may be difficult to discharge it from a truck. If the slump is too high, the concrete may not be useable. In this embodiment, the slump can be any value recited above or range between any of the recited values.

In an other particular embodiment of the invention, the LWC ready mix composition is used in a traditional ready mix application, which includes, but is not limited to tilt up construction, pour in place, lightweight grouts, ICF fill and other applications where concrete is poured or pumped and transported, for example in ready-mix trucks, to job sites.

The LWC concrete ready mix compositions of the invention can include the formulations and compositions described above.

In many of the embodiments of the LWC concrete ready mix compositions of the invention, the compositions are prepared by adding one or more of the following components in the stated order: sand, coarse aggregate, cement, prepuff beads, polymer particles and/or expanded polymer particles, water and water reducer. A pan or drum style mixer can be used and the water to cement ratio is often at least 0.40.

The LWC concrete ready mix compositions of the invention can utilize any suitable cement, non-limiting examples including Type I, Type II, and Type III and combinations thereof. In particular embodiments of the invention, the cement is present in the ready mix composition, at from at least about 8 and in some cases at least about 10 volume percent and can be up to about 20, in some cases up to about 17 volume percent and in particular instances about 14 volume percent. The exact amount of cement is designed into a particular mix and will depend on the type of cement, intended application and the design of the LWC ready mix composition. The amount of cement in the LWC concrete ready mix compositions can be any value or range between any of the values recited above.

In this particular embodiments of the invention, sand, as described above, is present in the ready mix composition, at from at least about 11, in some cases at least about 14, and in other cases at least about 17 volume percent and can be up to about 50, in some cases up to about 40, and in other cases up to about 30 volume percent. The exact amount of sand is designed into a particular mix and will depend on the type of sand (coarse or fine), intended application and the design of the LWC ready mix composition. The amount of sand in the LWC concrete ready mix compositions can be any value or range between any of the values recited above.

Further to this particular embodiment of the invention, the prepuff beads, polymer particles and/or expanded polymer particles of the invention can be present at from at least about 10, in some cases at least about 14, and in other cases at least about 18 volume percents and can be present at up to about 31, in some cases up to about 29, and in other cases up to about 27 volume percent. The exact amount of prepuff beads, polymer particles and/or expanded polymer particles is designed into a particular mix and will depend on the density of the particles and/or beads, intended application and the design of the LWC ready mix composition. The amount of prepuff beads, polymer particles and/or expanded polymer particles in the LWC concrete ready mix compositions can be any value or range between any of the values recited above.

Additionally, in this particular embodiment, the prepuff beads, polymer particles and/or expanded polymer particles used in the LWC ready mix compositions can have particle sizes and dimensions as described above and can have a density of from at least about 1 lb/ft$^3$ (0.016 g/cc), in some cases at least about 1.25 lb/ft$^3$ (0.02 g/cc), in other cases at least about 1.5 lb/ft$^3$ (0.024 g/cc) and in some instances at least about 2 lb/ft$^3$ (0.032 g/cc) and can be up to about 40 lb/ft$^3$ (0.64 g/cc), in many instances up to about 5.5 lb/ft$^3$ (0.088 g/cc), in some cases up to about 4 lb/ft$^3$ (0.064 g/cc) and in other cases up to about 3.5 lb/ft$^3$ (0.056 g/cc). The density of the prepuff beads, polymer particles and/or expanded polymer particles in the LWC concrete ready mix compositions can be any value or range between any of the values recited above.

Additionally, in these particular embodiments of the invention, coarse aggregate such as stone, as described above, can be present in the ready mix composition, at from at least about 9, in some cases at least about 14, and in other cases at least about 17 volume percent and can be up to about 40, in some cases up to about 30, and in other cases up to about 25 volume percent. The exact amount, type and size of coarse aggregate is designed into a particular mix and will depend on the intended application and the design of the LWC ready mix composition. The amount of coarse aggregate in the LWC concrete ready mix compositions can be any value or range between any of the values recited above. The coarse aggregate can have a diameter of from at least about 0.375 inches (0.95 cm), in some cases about 0.5 inches (1.3 cm), in other cases about 0.75 inches (1.9 cm) to up to about 2 inches (5 cm).

Also, in these particular embodiments of the invention, water can be present in the ready mix composition, at from at least about 10 volume percent, in some cases at least about 14 volume percent up to about 22 volume percent, in some cases up to about 20 volume percent and in other cases up to about 18 volume percent. The amount of water in the LWC concrete ready mix compositions can be any value or range between any of the values recited above.

The LWC concrete ready mix compositions of these embodiments when set and/or hardened can have a compressive strength of at least about 1400 psi (98 kgf/cm$^2$), in some cases at least about 1500 psi (105.5 kgf/cm$^2$), in other cases at least about 1600 psi (112.5 kgf/cm$^2$), in some instances at least about 1800 psi (126.5 kgf/cm$^2$), and in other instances at least about 2000 psi (140.6 kgf/cm$^2$) and optionally can be up to about 3600 psi (253 kgf/cm$^2$) in some cases up to about 3300 psi (232 kgf/cm$^2$) and in other cases up to about 3000 psi (211 kgf/cm$^2$). In other embodiments of the invention, the LWC concrete ready mix compositions can have structural compressive strengths of about 4000 psi (281 kgf/cm$^2$) or greater in 48 hours for post-tensioned applications and 28-day compressive strengths of about 4500 psi (316 kgf/cm$^2$) or greater. In these embodiments, compressive strengths are determined according to ASTM C39 at 28 days. The exact compressive strength of a LWC concrete ready mix composition will depend on its formulation, density and intended application. The compressive strength of the LWC concrete ready mix compositions can be any value or range between any of the values recited above.

The LWC compositions can be used in most, if not all, applications where traditional concrete formulations are used. As non-limiting examples, the present LWC compositions can be used in structural and architectural applications, non-limiting examples being party walls, ICF or SIP structures, bird baths, benches, shingles, siding, drywall, cement board, decorative pillars or archways for buildings, etc., furniture or household applications such as counter tops, in-floor radiant heating systems, floors (primary and secondary), tilt-up walls, sandwich wall panels, as a stucco coating, road and airport safety applications such as arresting walls, Jersey Barriers, sound barriers and walls, retaining walls, runway arresting systems, air entrained concrete, runaway truck ramps, flowable excavatable backfill, and road construction applications such as road bed material and bridge deck material.

In embodiments of the invention, when coarse aggregate is not used, LWC articles according to the invention readily accept direct attachment of screws, as a non-limiting example drywall screws and nails, which can be attached by traditional, pneumatic, or powder actuated devices. This allows easy attachment of materials such as plywood, drywall, studs and other materials commonly used in the construction industry, which cannot be done using traditional concrete formulations.

When the LWC compositions of the invention are used in road bed construction, the polymer particles can aid in preventing and or minimizing crack propagation, especially when water freeze-thaw is involved.

The compositions of the invention are well suited to the fabrication of molded construction articles and materials, non-limiting examples of such include wall panels including tilt-up wall panels, T beams, double T beams, roofing tiles, roof panels, ceiling panels, floor panels, I beams, foundation walls and the like. The compositions exhibit greater strength than prior art LWC compositions.

In an embodiment of the invention, the molded construction articles and materials can be pre-cast and/or pre-stressed.

As used herein, "pre-cast" concrete refers to concrete poured into a mold or cast of a required shape and allowed to cure and/or harden before being taken out and put into a desired position.

In embodiments of the invention, the LWC compositions used in pre-cast applications, which include, but are not limited to precast parts such as beams, double-Ts, pipes, insulated walls, prestressed products, and other products where the LWC composition is poured directly into forms and final parts are transported to job sites by truck. In these embodiments of the invention, the slump value ranges from at least about 8 inch (20 cm) and in some cases at least about 10 inches (25.4 cm) to up to about 20 inches (50 cm), in some cases up to about 18 inches (46 cm) and in other cases up to about 16 inches (41 cm). In these embodiments, the slump can be any value or range between any of the recited values.

As used herein, "pre-stressed" concrete refers to concrete whose tension has been improved by using prestressing tendons (in many cases high tensile steel cable or rods), which are used to provide a clamping load producing a compressive strength that offsets the tensile stress that the concrete member would otherwise experience due to a bending load. Any suitable method known in the art can be used to pre-stress concrete. Suitable methods include, but are not limited to pre-tensioned concrete, where concrete is cast around already tensioned tendons, and post-tensioned concrete, where compression is applied after the pouring and curing processes.

A particular advantage in some embodiments is that the present set concrete compositions not containing coarse aggregate and/or molded construction articles formed from such compositions can be readily cut and/or sectioned using conventional methods as opposed to having to use specialized concrete or diamond tipped cutting blades and/or saws. This provides substantial time and cost savings when customizing concrete articles.

The compositions can be readily cast into molds according to methods well known to those of skill in the art for, as non-limiting examples, roofing tiles, paver, or other articles in virtually any three dimensional configuration desired, including configurations having certain topical textures such as having the appearance of wooden shakes, slate shingles or smooth faced ceramic tiles. A typical shingle can have approximate dimensions of ten inches in width by seventeen inches in length by one and three quarters inches in thickness. In the molding of roofing materials, the addition of an air entrainment agent makes the final product more weatherproof in terms of resistance to freeze/thaw degradation.

When foundation walls are poured using the LWC compositions of the invention, the walls can be taken above grade due to the lighter weight. Ordinarily, the lower part of the foundation wall has a tendency to blow outwards under the sheer weight of the concrete mixture, but the lighter weight of the compositions of the invention tend to lessen the chances of this happening. Foundation walls prepared using the present LWC compositions can readily take conventional fasteners used in conventional foundation wall construction.

In an embodiment of the invention, the concrete compositions according to the invention are formed, set and/or hardened in the form of a concrete masonry unit. As used herein, the term "concrete masonry unit" refers to a hollow or solid concrete article including, but not limited to scored, split face, ribbed, fluted, ground face, slumped and paving stone varieties. Embodiments of the invention provide walls that include, at least in part, concrete masonry units made according to the invention.

In an embodiment of the invention, when coarse aggregate is not used, the molded construction articles and materials and concrete masonry units described above are capable of receiving and holding penetrating fasteners, non-limiting examples of such include nails, screws, staples and the like. This can be beneficial in that surface coverings can be attached directly to the molded construction articles and materials and concrete masonry units molded construction articles and materials and concrete masonry units.

In an embodiment of the invention, a standard 2½ inch drywall screw can be screwed into a poured and set surface containing the present light weight concrete composition, to a depth of 1½ inches, and is not removed when a force of at least 500, in some cases at least 600 and in other cases at least 700 and up to 800 pounds of force is applied perpendicular to the surface screwed into for one, in some cases five and in other cases ten minutes.

The present invention is also directed to buildings that include the LWC compositions according to the invention.

The present invention also provides a method of making an optimized lightweight concrete article that includes:
identifying the desired density and strength properties of a set lightweight concrete composition;
determining the type, size and density of polymer beads to be expanded for use in the light weight concrete composition;
determining the size and density the polymer beads are to be expanded to;
expanding the polymer beads to form expanded polymer beads;
dispersing the expanded polymer beads in a cementitious mixture to form the light weight concrete composition; and
allowing the light weight concrete composition to set in a desired form.

The desired density and strength properties of the set and/or hardened LWC composition are determined based on the intended application.

In an embodiment of the invention, the type, size and density of polymer beads to be expanded and the size and density the polymer beads are to be expanded to can be determined based on empirical and/or published data.

In another embodiment of the invention, finite element analysis can be used to determine the type, size and density of polymer beads to be expanded and the size and density the polymer beads are to be expanded to.

The resulting lightweight concrete composition is allowed to set and/or harden to provide LWC articles and concrete masonry units as described above.

The present invention will further be described by reference to the following examples. The following examples are merely illustrative of the invention and are not intended to be limiting. Unless otherwise indicated, all percentages are by weight and Portland cement is used unless otherwise specified.

EXAMPLES

Unless otherwise indicated, the following materials were utilized:
Type III Portland Cement
Mason Sand (165 pcf bulk density, 2.64 specific gravity, fineness modulus =1.74)
Potable Water—ambient temperature (~70° F./21° C.)
Expandable Polystyrene—M97BC, F271C, F271M, F271T (NOVA Chemicals Inc., Pittsburgh, Pa.)
EPS Resin—1037C (NOVA Chemicals, Inc.)
½ inch Expanded Slate (Carolina Stalite Company, Salisbury, N.C.—89.5 pcf bulk density/1.43 specific gravity)

Unless otherwise indicated, all compositions were prepared under laboratory conditions using a model 42N-5 blender (Charles Ross & Son Company, Hauppauge, N.Y.) having a 7-ft$^3$ working capacity body with a single shaft paddle. The mixer was operated at 34 rpm. Conditioning was performed in a LH-10 Temperature and Humidity Chamber (manufactured by Associated Environmental Systems, Ayer, Mass.). Samples were molded in 6"×12" single use plastic cylinder molds with flat caps and were tested in triplicate. Compression testing was performed on a Forney FX250/300 Compression Tester (Forney Incorporated, Hermitage, Pa.), which hydraulically applies a vertical load at a desired rate. All other peripheral materials (slump cone, tamping rods, etc.) adhered to the applicable ASTM test method. The following ASTM test methods and procedures were followed:
ASTM C470—Standard Specification for Molds for Forming Concrete Test Cylinders Vertically
ASTM C192—Standard Practice for Making and Curing Concrete Test Specimens in the Laboratory
ASTM C330—Standard Specification for Lightweight Aggregates for Structural Concrete
ASTM C511—Standard Specification for Mixing Rooms, Moist Cabinets, Moist Rooms, and Water Storage Tanks Used in the Testing of Hydraulic Cements and Concretes
ASTM C143—Standard Test Method for Slump of Hydraulic-Cement Concrete
ASTM C1231—Standard Practice for Use of Unbonded Caps in Determination of Compressive Strength of Hardened Concrete Cylinders
ASTM C39—Standard Test Method for Compressive Strength of Cylindrical Concrete Specimens Cylinders were kept capped and at ambient laboratory conditions for 24 hours. All cylinders were then aged for an additional 6 days at 23±2° C., 95% relative humidity. The test specimens were then tested.

Example 1

Polystyrene in unexpanded bead form (M97BC-0.65mm, F271T-0.4 mm, and F271M-0.33 mm) was pre-expanded into EPS foam (prepuff) particles of varying densities as shown in the table below.

| | | Prepuff Particle | | |
|---|---|---|---|---|
| Bead Type | Bead Mean Size, μm | Bulk Density, lb/ft$^3$ | Mean Size, μm | Standard deviation, μm |
| F271M | 330 | 2.32 | 902 | 144 |
| F271M | 330 | 3.10 | 824 | 80 |
| F271M | 330 | 4.19 | 725 | 103 |
| F271T | 400 | 2.40 | 1027 | 176 |
| F271T | 400 | 3.69 | 1054 | 137 |
| F271T | 400 | 4.57 | 851 | 141 |
| M97BC | 650 | 2.54 | 1705 | 704 |
| M97BC | 650 | 3.29 | 1474 | 587 |
| M97BC | 650 | 5.27 | 1487 | 584 |

The data show that the prepuff particle size varies inversely with the expanded density of the material.

Example 2

Polystyrene in unexpanded bead form (0.65mm, 0.4mm, and 0.33 mm) was pre-expanded into prepuff particles with a bulk density of 2 lb/ft$^3$ as shown in the table below. The prepuff particles were formulated into a LWC composition, in a 3.5 cubic foot drum mixer, that included 46.5 wt. % (25.3 vol. %) Portland cement, 16.3 wt. % (26.3 vol. %) water, and 1.2 wt. %
(26.4 vol. %) prepuff particles. The resulting LWC compositions had a concrete density of 90 lb/ft$^2$. The average compressive strength (determined according to ASTM C39, seven day break test) is shown in the table below.

| | Prepuff Particle | Concrete | |
|---|---|---|---|
| Bead Mean Size, μm | Bulk Density, lb/ft$^3$ | Density, lb/ft$^3$ | Compressive Strength, psi |
| 650 | 2.00 | 90 | 1405 |
| 400 | 2.00 | 90 | 1812 |
| 330 | 2.00 | 90 | 1521 |

The data show that as the mean unexpanded bead size decreases, at a constant prepuff particle density, that surprisingly higher compressive strength does not necessarily result from ever decreasing unexpanded bead size as suggested in the prior art. More particularly, the data show that an optimum unexpanded bead size with respect to compressive strength at 2.00 pcf exists when loaded to obtain 90 pcf concrete density. This optimum appears to be between 330 microns and 650 microns for this particular formulation.

Example 3

Since the prepuff particle density also impacts the overall concrete density, changing the EPS density requires a change in the EPS loading level to maintain a constant concrete density. This relationship holds only as long as the total amount of prepuff particles is not so large as to compromise the strength of the surrounding concrete matrix. The relationship between the prepuff particle density and loading level provides additional opportunities to optimize concrete strength while controlling the overall concrete density.

Polystyrene in unexpanded bead form (0.65 mm) was pre-expanded into prepuff particles having varying densities as shown in the table below. The prepuff particles were formulated into LWC compositions containing the components shown in the table below, in a 3.5 cubic foot drum mixer, and each having a concrete density of 90 lb/ft$^3$.

|  | Sample A | Sample B | Sample C |
|---|---|---|---|
| Prepuff Particle Bulk Density (lb/ft$^3$) | 1.26 | 3.29 | 5.37 |
| Portland Cement, wt. % (vol. %) | 46.7 (28.5) | 46.2 (22.1) | 45.8 (18.9) |
| Water, wt. % (vol. %) | 16.4 (29.8) | 16.2 (23) | 16.1 (19.7) |
| EPS, wt. % (vol. %) | 0.7 (16.8) | 1.8 (35.6) | 2.6 (44.9) |
| Sand, wt. % (vol. %) | 36.2 (24.9) | 35.8 (19.3) | 35.5 (16.5) |

The following data table numerically depicts the relationship between prepuff density and concrete strength at a constant concrete density of 90 lb/ft$^3$.

|  | Bead | Prepuff Particle | Concrete | |
|---|---|---|---|---|
|  | Mean Size, μm | Bulk Density, lb/ft$^3$ | Density, lb/ft$^3$ | Compressive Strength, psi |
| Sample A | 650 | 1.26 | 90 | 1463 |
| Sample B | 650 | 3.29 | 90 | 1497 |
| Sample C | 650 | 5.37 | 90 | 2157 |

The data show that as the prepuff particle density increases, the compressive strength of the LWC composition also increases at constant concrete density.

Example 4

Polystyrene in unexpanded bead form (0.65 mm) was pre-expanded into prepuff particles having a bulk density of 1.1 lb/ft$^3$ as shown in the table below. The prepuff particles were formulated into LWC compositions, in a 3.5 cubic foot drum mixer, containing the components shown in the table below.

|  | Sample D | Sample E | Sample F |
|---|---|---|---|
| Prepuff Particle Bulk Density (lb/ft$^3$) | 1.1 | 1.1 | 1.1 |
| Portland Cement, wt. % (vol. %) | 46.8 (21.6) | 46.3 (18.9) | 46.1 (16.6) |
| Water, wt. % (vol. %) | 16.4 (22.5) | 17 (20.6) | 17 (18.2) |
| EPS, wt. % (vol. %) | 0.6 (37) | 0.9 (44) | 1.1 (50.8) |
| Sand, wt. % (vol. %) | 36.2 (18.9) | 35.9 (16.5) | 35.8 (14.5) |

The following data table numerically depicts the relationship between prepuff loading, concrete strength and concrete density.

|  | Bead | Prepuff Particle | Concrete | |
|---|---|---|---|---|
|  | Mean Size, μm | Bulk Density, lb/ft$^3$ | Density, lb/ft$^3$ | Compressive Strength, psi |
| Sample D | 650 | 1.1 | 89.6 | 1252 |
| Sample E | 650 | 1.1 | 80.9 | 982 |
| Sample F | 650 | 1.1 | 72.4 | 817 |

The data show that as prepuff particle loading in the LWC composition increases at constant foam particle density, the light weight concrete density and compressive strength decreases.

Example 5

Polystyrene in unexpanded bead form (0.65 mm) was pre-expanded into prepuff particles having various densities as shown in the table below. The prepuff particles were formulated into LWC compositions, in a 3.5 cubic foot drum mixer, containing the components shown in the table below.

|  | Sample G | Sample H | Sample I | Sample J |
|---|---|---|---|---|
| Prepuff Particle Bulk Density (lb/ft$^3$) | 1.1 | 2.3 | 3.1 | 4.2 |
| Portland Cement, wt. % (vol. %) | 46.8 (21.6) | 46.8 (26.8) | 46.8 (28.4) | 46.8 (29.7) |
| Water, wt. % (vol. %) | 16.4 (22.5) | 16.4 (28) | 16.4 (29.6) | 16.4 (31) |
| EPS, wt. % (vol. %) | 0.6 (37) | 0.6 (21.8) | 0.6 (17.2) | 0.6 (13.4) |
| Sand, wt. % (vol. %) | 36.2 (18.9) | 36.2 (23.4) | 36.2 (24.8) | 36.2 (25.9) |

The following table numerically depicts the relationship between prepuff density and concrete strength at a constant concrete prepuff loading based on the weight of the formulation.

|  | Bead | Prepuff Particle | Concrete | |
|---|---|---|---|---|
|  | Mean Size, μm | Bulk Density, lb/ft$^3$ | Density, lb/ft$^3$ | Compressive Strength, psi |
| Sample G | 650 | 1.1 | 89.6 | 1252 |
| Sample H | 650 | 2.32 | 109.6 | 1565 |
| Sample I | 650 | 3.1 | 111.7 | 2965 |
| Sample J | 650 | 4.2 | 116.3 | 3045 |

The data show that as prepuff particle density in the light weight concrete composition increases at constant prepuff particle loading (by weight), lightweight concrete density and compressive strength increases.

Example 6

Polystyrene in unexpanded bead form (0.65 mm) was pre-expanded into prepuff particles having various densities as shown in the table below. The prepuff particles were formulated into LWC compositions, in a 3.5 cubic foot drum mixer, containing the components shown in the table below.

|  | Sample L | Sample M |
|---|---|---|
| Prepuff Particle Bulk Density (lb/ft³) | 1.1 | 3.1 |
| Portland Cement, wt. % (vol. %) | 46.3 (18.9) | 46.2 (21.4) |
| Water, wt. % (vol. %) | 17 (20.6) | 16.2 (22.3) |
| EPS, wt. % (vol. %) | 0.9 (44) | 1.8 (37.5) |
| Sand, wt. % (vol. %) | 35.9 (16.5) | 35.8 (18.7) |

The following table numerically depicts the relationship between prepuff density and concrete strength at a constant concrete density.

|  | Bead Mean Size, μm | Prepuff Particle Bulk Density, lb/ft³ | Concrete Density, lb/ft³ | Concrete Compressive Strength, psi |
|---|---|---|---|---|
| Sample L | 650 | 1.1 | 80.9 | 982 |
| Sample M | 650 | 3.1 | 79.8 | 1401 |

The data show that as prepuff particle density in the LWC composition increases at constant concrete density, the compressive strength of the LWC increases.

Example 7

Polystyrene in unexpanded bead form (0.65 mm) was pre-expanded into prepuff particles having various densities as shown in the table below. The prepuff particles were formulated into LWC compositions, in a 3.5 cubic foot drum mixer, containing the components shown in the table below.

|  | Sample N | Sample O |
|---|---|---|
| Prepuff Particle Bulk Density (lb/ft³) | 3.9 | 5.2 |
| Portland Cement, wt. % (vol. %) | 46 (21.5) | 45.6 (21.4) |
| Water, wt. % (vol. %) | 16.1 (22.4) | 16 (22.3) |
| EPS, wt. % (vol. %) | 2.3 (37.3) | 3 (37.5) |
| Sand, wt. % (vol. %) | 35.6 (18.8) | 35.4 (18.7) |

The following data table numerically depicts the relationship between prepuff density and concrete strength at a constant concrete density.

|  | Bead Mean Size, μm | Prepuff Particle Bulk Density, lb/ft³ | Concrete Density, lb/ft³ | Concrete Compressive Strength, psi |
|---|---|---|---|---|
| Sample N | 650 | 3.9 | 85.3 | 1448 |
| Sample O | 650 | 5.2 | 84.3 | 1634 |

The data show that as prepuff particle density in the LWC composition increases at constant concrete density, the compressive strength of the LWC increases.

Example 8

The following examples demonstrate the use of expanded slate as an aggregate in combination with the prepuff particles of the present invention. Polystyrene in unexpanded bead form was pre-expanded into prepuff particles having various densities as shown in the table below. The prepuff particles were formulated into LWC compositions, in a 3.5 cubic foot drum mixer, containing the components shown in the table below.

| Mixed expanded slate/EPS runs | Example P | Example Q |
|---|---|---|
| Bead Mean Size, micron | 0.33 | 0.4 |
| Prepuff Particle Bulk Density, pcf | 5.24 | 4.5 |
| Weight % |  |  |
| Cement | 19.84% | 21.02% |
| EPS | 1.80% | 1.44% |
| Expanded Slate | 42.02% | 39.07% |
| Water | 6.96% | 7.36% |
| Volume % |  |  |
| Cement | 9.53% | 10.34% |
| EPS | 22.71% | 21.74% |
| Expanded slate | 41.91% | 39.91% |
| Water | 9.95% | 10.78% |
| LWC density (pcf) | 90.9 | 93.7 |
| LWC strength (psi) | 1360.0 | 1800.0 |

The data show that desirable lightweight concrete can be obtained using the prepuff of the present invention and expanded slate as aggregate in lightweight concrete compositions.

Example 9

The following examples demonstrate the use of expanded slate as an aggregate used in combination with the prepuff particles of the present invention. Polystyrene in unexpanded bead form was pre-expanded into prepuff particles having various densities as shown in the table below. The prepuff particles were formulated into LWC compositions, in a 3.5 cubic foot drum mixer, containing the components shown in the table below.

|  | Example R | Example S | Example T | Example U | Example V | Example W |
|---|---|---|---|---|---|---|
| Bead size (mm) | 0.5 | 0.4 | 0.4 | 0.4 | 0.4 | 0.4 |
| Prepuff density (lb./ft$^3$) | 40 (unexpanded) | 3.4 | 3.4 | 3.4 | 3.4 | 3.4 |
| Weight % | | | | | | |
| Cement | 34.4% | 35.0% | 36.2% | 37.3% | 35.9% | 37.1% |
| Sand | 0.0% | 23.2% | 9.9% | 0.0% | 15.8% | 1.9% |
| EPS | 25.0% | 1.5% | 1.4% | 0.6% | 1.5% | 1.3% |
| Slate | 25.9% | 26.3% | 38.1% | 47.1% | 32.4% | 44.7% |
| Water | 14.6% | 14.0% | 14.5% | 14.9% | 14.4% | 14.9% |
| Total | 100.0% | 100.0% | 100.0% | 100.0% | 100.0% | 100.0% |
| water/cement | 0.43 | 0.40 | 0.40 | 0.40 | 0.40 | 0.40 |
| Volume % | | | | | | |
| Cement | 15.8% | 16.1% | 16.1% | 18.3% | 16.1% | 16.1% |
| Sand | 0.0% | 12.1% | 5.0% | 0.0% | 8.0% | 1.0% |
| EPS | 39.5% | 27.3% | 24.4% | 11.9% | 26.4% | 23.4% |
| Slate | 24.7% | 25.2% | 35.3% | 48.0% | 30.3% | 40.3% |
| Water | 20.0% | 19.2% | 19.2% | 21.8% | 19.2% | 19.2% |
| total | 100.0% | 100.0% | 100.0% | 100.0% | 100.0% | 100.0% |
| compressive strength (psi) | 3813 | 2536 | 2718 | 4246 | 2549 | 2516 |
| density (pcf) | 89.3 | 91.1 | 90.7 | 98.0 | 89.7 | 89.9 |

Example 10

One-foot square, 4 inch thick concrete forms were made by pouring formulations prepared according to examples X and Y in the table below into forms and allowing the formulations to set for 24 hours.

|  | Example X | Example Y |
|---|---|---|
| bead size (mm) | 0.4 | 0.65 |
| Prepuff density (lb./ft$^3$) | 3.4 | 4.9 |
| wt % | | |
| Cement | 35.0% | 33.1% |
| Sand | 23.2% | 45.4% |
| EPS | 1.5% | 2.9% |
| Slate | 26.3% | 0.0% |
| Water | 14.0% | 13.2 |
| total | 100.0% | |
| water/cement | 0.40 | 40.0% |
| Volume % | | |
| Cement | 16.1% | 16.0% |
| Sand | 12.1% | 24.7% |
| EPS | 27.3% | 40.3% |
| Slate | 25.2% | 0.0% |
| Water | 19.2% | 19.1% |
| total | 100.0% | |
| compressive strength (psi) | 2536 | 2109 |
| density (pcf) | 91.1 | 90.6 |

After 7 days, a one-foot square, ½ inch sheet of plywood was fastened directly to the formed concrete. A minimum of one-inch penetration was required for adequate fastening. The results are shown in the table below.

| Fastener | Example X | Example Y |
|---|---|---|
| 7 d coated nails | | |
| attachment | No penetration when slate is encountered | 100% penetration and attachment |
| removal | Easily removed | Could not be manually removed from the concrete without mechanical assistance |
| 2½ inch standard dry wall screw | | |
| attachment | No penetration when slate is encountered | 100% penetration and attachment. Screw broke before concrete failed. |
| removal | Easily removed | Could not be manually removed from the concrete without mechanical assistance. Screw could be removed and reinserted with no change in holding power. |

The data demonstrates that the present lightweight concrete composition, without slate, provides superior gripping capability with plywood using standard fasteners compared to traditional expanded slate formulations, while slate containing concrete did not readily accept fasteners. This represents an improvement over the prior art as the time consuming practice of fixing anchors into the concrete to enable the fasteners to grip thereto can be eliminated.

Example 11

One-foot square, 4 inch thick concrete forms were made by pouring the formulations of Examples X and Y into forms and allowing the formulations to set for 24 hours. After 7 days, a one-foot square, ½ inch sheet of standard drywall sheet was fastened directly to the formed concrete using standard 1¾ inch drywall screws. A minimum of one-inch screw penetration was required for adequate fastening. The results are shown in the table below.

| Fastener | Example X | Example Y |
|---|---|---|
| 1¾ inch standard dry wall screw | | |
| attachment | No penetration when slate is encountered | 100% penetration and attachment. Screw could penetrate through the drywall. |
| removal | Easily removed. | Could not be manually removed from the concrete without mechanical assistance. Screw could be removed and reinserted with no change in holding power. |

The data demonstrates that the present lightweight concrete composition, without slate, provides superior gripping capability compared to traditional expanded slate formulations, which did not readily accept fasteners. This represents an improvement over the prior art as the time consuming practice of fastening nailing studs to the concrete to allow for attaching the drywall thereto can be eliminated.

Example 12

Two-foot square, 4 inch thick concrete forms were made by pouring the formulations Examples X and Y into a form and allowing the formulations to set for 24 hours. After 7 days, a three foot long, 2"×4" stud was fastened directly to the formed concrete using standard 16d nails. A minimum of two-inch nail penetration was required for adequate fastening. The results are shown in the table below.

| Fastener | Example X | Example Y |
|---|---|---|
| 16 d nail | | |
| attachment | No penetration when slate is encountered | 100% penetration and attachment. |
| removal | Easily removed. | Could not be manually removed from the concrete without mechanical assistance. |

The data demonstrates that the present lightweight concrete composition, without slate, provides superior gripping capability compared to traditional expanded slate formulations, which did not readily accept fasteners. This represents an improvement over the prior art as the expensive and time consuming practice of using TAPCON® (available from Illinois Tool Works Inc., Glenview, Ill.) or similar fasteners, lead anchors, or other methods known in the art to fasten studs to concrete can be eliminated.

Example 13

Concrete without additional aggregate was made using the ingredients shown in the table below.

| | Ex. AA | Ex. BB | Ex. CC | Ex. DD | Ex. EE | Ex. FF | Ex. GG | Ex. HH | Ex. II |
|---|---|---|---|---|---|---|---|---|---|
| Starting Bead | F271T | F271C | M97BC | F271T | F271C | M97BC | F271T | F271C | M97BC |
| bead size (mm) | 0.4 | 0.51 | 0.65 | 0.4 | 0.51 | 0.65 | 0.4 | 0.51 | 0.65 |
| Density (pcf) | 1.2 | 1.3 | 1.5 | 3.4 | 3.3 | 3.4 | 5.7 | 5.5 | 4.9 |
| Prepuff size (mm) | 1.35 | 1.56 | 2.08 | 0.87 | 1.26 | 1.54 | 0.75 | 1.06 | 1.41 |
| Expansion Factor | 48 | 48 | 48 | 18 | 18 | 18 | 12 | 12 | 12 |
| wt % | | | | | | | | | |
| Cement | 33.0 | 35.8 | 35.0 | 33.0 | 33.0 | 35.0 | 33.0 | 33.0 | 33.1 |
| Sand | 51.5 | 47.2 | 50.1 | 50.3 | 50.4 | 48.9 | 49.0 | 49.2 | 45.3 |
| EPS | 0.6 | 0.8 | 0.9 | 1.8 | 1.7 | 2.2 | 3.0 | 3.0 | 2.9 |
| Water | 14.9 | 16.1 | 14.0 | 14.8 | 14.8 | 14.0 | 14.9 | 14.8 | 13.2 |
| Volume % | | | | | | | | | |
| Cement | 16.0 | 16.0 | 16.0 | 16.0 | 16.0 | 16.0 | 16.0 | 16.0 | 16.0 |
| Sand | 28.1 | 23.7 | 25.8 | 27.5 | 27.5 | 25.2 | 26.8 | 26.9 | 24.7 |
| EPS | 34.5 | 38.8 | 39.1 | 35.1 | 35.1 | 39.8 | 35.8 | 35.7 | 40.2 |
| Water | 21.4 | 21.4 | 19.1 | 21.4 | 21.4 | 19.1 | 21.4 | 21.4 | 19.1 |
| compressive strength (psi) | 1750 | 1650 | 1720 | 1770 | 2200 | 1740 | 1850 | 2400 | 2100 |
| density (pcf) | 93 | 87 | 89 | 90 | 92 | 88 | 89 | 90 | 90 |

The data shows that the average prepuff size required to provide maximum compressive strength compositions is dependant, to some degree, on the expansion factor of the prepuff. Focusing on average prepuff size alone does not provide a good indicator of maximum potential concrete strength. This point is illustrated by comparing Examples BB and FF. Example FF (1.54 mm size) does not provide maximum compressive strength at an 18× expansion factor, yet it is near the maximum strength that can be obtained from beads expanded 48×.

Using a combination of prepuff size and expansion factor can provide an indicator for maximum concrete strength. As an example, Example AA (prepuff size, 1.35 mm and expansion factor 48) provides 93 pcf concrete with a compressive strength of 1750 psi while a similarly sized prepuff, Example II (prepuff size 1.41 mm and expansion factor 12) provides 90 pcf concrete with a significantly higher compressive strength of 2100 psi. Thus smaller prepuff size and a lower expansion factor can provide higher compressive strength in the present lightweight concrete composition within an optimum range of prepuff particle size.

Example 14

Concrete with expanded slate as an aggregate was made using the ingredients shown in the table below.

|  | Ex. JJ | Ex. KK | Ex. LL | Ex. MM | Ex. NN | Ex. OO | Ex. PP | Ex. QQ | Ex. RR |
|---|---|---|---|---|---|---|---|---|---|
| Starting Bead | F271T | F271T | F271T | F271T | F271T | F271T | F271T | F271T | F271T |
| bead size (mm) | 0.4 | 0.4 | 0.4 | 0.4 | 0.4 | 0.4 | 0.4 | 0.4 | 0.4 |
| Density (pcf) | 3.4 | 3.4 | 3.4 | 3.4 | 3.4 | 3.4 | 3.4 | 3.4 | 3.4 |
| Prepuff size (mm) | 0.87 | 0.87 | 0.87 | 0.87 | 0.87 | 0.87 | 0.87 | 0.87 | 0.87 |
| Expansion Factor | 18 | 18 | 18 | 18 | 18 | 18 | 18 | 18 | 18 |
| wt % | | | | | | | | | |
| Cement | 35.9 | 33.0 | 30.5 | 35.9 | 33.0 | 30.6 | 35.9 | 33.0 | 30.6 |
| Sand | 0 | 8.2 | 15.6 | 10.6 | 18.0 | 24.3 | 21.1 | 27.7 | 33.2 |
| EPS | 1.1 | 0.8 | 0.5 | 1.3 | 1.0 | 0.7 | 1.6 | 1.2 | 0.9 |
| Exp. Slate | 48.7 | 44.8 | 41.3 | 37.8 | 34.8 | 32.2 | 27.0 | 24.9 | 23.0 |
| Water | 14.4 | 13.2 | 12.2 | 14.4 | 13.2 | 12.2 | 14.4 | 13.2 | 12.2 |
| Volume % | | | | | | | | | |
| Cement | 16.0 | 16.0 | 16.0 | 16.0 | 16.0 | 16.0 | 16.0 | 16.0 | 16.0 |
| Sand | 0 | 4.5 | 9.3 | 5.3 | 9.8 | 14.3 | 10.6 | 15.1 | 19.6 |
| EPS | 19.9 | 15.5 | 10.7 | 24.6 | 20.2 | 15.7 | 29.3 | 24.9 | 20.4 |
| Exp. Slate | 45.0 | 45.0 | 45.0 | 35.0 | 35.0 | 35.0 | 25.0 | 25.0 | 25.0 |
| Water | 19.1 | 19.1 | 19.1 | 19.1 | 19.1 | 19.1 | 19.1 | 19.1 | 19.1 |
| 7 - day strength (psi) | 3220 | 3850 | 4070 | 2440 | 2890 | 3745 | 2300 | 2625 | 3695 |
| Density (pcf) | 92.8 | 98.5 | 102.7 | 90.7 | 96.8 | 101.5 | 88.1 | 94.5 | 101.3 |

The data indicates that while the EPS volume required to maintain approximately 90 pcf density concrete decreases somewhat linearly as the slate concentration increases; the present lightweight concrete's strength increases exponentially as the amount of slate in the formulation increases. This relationship highlights the potentially significant impact of including aggregates in the present light weight concrete formulation and demonstrates the potential for optimizing the amount of EPS and aggregates in the formulation to maximize strength at a desired density. In addition, the cost of various components can also be included in such a design and the lightweight concrete formulation can be optimized for both maximum strength and lowest cost.

Example 15

Concrete with unexpanded EPS (1037C) and no additional aggregate was made using the ingredients shown in the table below.

|  | Ex. JJ | Ex. KK | Ex. LL |
|---|---|---|---|
| bead size (mm) | 0.51 | 0.51 | 0.51 |
| Density (pcf) | 40 | 40 | 40 |
| Expansion Factor | 1 | 1 | 1 |
| wt % | | | |
| Cement | 38.7 | 33.0 | 28.8 |
| Sand | 0 | 21.6 | 37.8 |
| EPS | 43.9 | 30.4 | 20.4 |
| Water | 17.4 | 14.9 | 13.0 |

-continued

|  | Ex. JJ | Ex. KK | Ex. LL |
|---|---|---|---|
| Volume % | | | |
| Cement | 16.0 | 16.0 | 16.0 |
| Sand | 0 | 11.8 | 23.6 |
| EPS | 62.6 | 50.7 | 38.9 |
| Slate | 21.4 | 21.4 | 21.4 |

-continued

|  | Ex. JJ | Ex. KK | Ex. LL |
|---|---|---|---|
| Water | 16.0 | 16.0 | 16.0 |
| compressive strength (psi) | 2558 | 2860 | 3100 |
| density (pcf) | 76 | 89 | 100 |

The data show that unexpanded polystyrene resin beads (~40 pcf bulk density) can provide a lightweight concrete composition having surprisingly high compressive strength (2500-3200 psi) at low density (76-100 pcf).

Example 16

Prepuff from F271T bead expanded to 1.2 lb/ft$^3$, F271C bead expanded to 1.3 lb/ft$^3$ and M97BC bead expanded to 1.5 lb/ft$^3$ were evaluated using scanning electron microscopy (SEM).

The external structure of the prepuff particles was generally spherical in shape having a continuous surface outer surface or skin. The internal cellular structure of the prepuff samples resembles a honeycomb-type structure.

The size of the prepuff particles was also measured using SEM, the results are shown in the table below.

| (microns) | T prepuff (1.2 pcf) | C prepuff (1.3 pcf) | BC prepuff (1.5 pcf) |
|---|---|---|---|
| Outer diameter | 1216 | 1360 | 1797 |
| Internal cell size | 42.7 | 52.1 | 55.9 |
| Internal cell wall | 0.42 | 0.34 | 0.24 |
| Cell wall/cell size | 0.0098 | 0.0065 | 0.0043 |

| | | C prepuff (3.4 pcf) | BC prepuff (3.1 pcf) |
|---|---|---|---|
| Outer diameter | | — | 1133 | 1294 |
| Internal cell size | | — | 38.2 | 31.3 |
| Internal cell wall | | — | 0.26 | 0.47 |
| Cell wall/cell size | | — | 0.0068 | 0.0150 |

Taken with all of the data presented above, the data provide an indication that internal cellular structure might affect the strength of a light weight concrete formulation.

When used in lightweight concrete compositions, the prepuff particles can impact the overall strength of the concrete in two ways. First, the larger particles, which have a lower density, change the concrete matrix surrounding the prepuff particle and secondly, the lower density prepuff particle is less rigid due to the cell structure of the foamed particle. Since the strength of the concrete depends, at least to some extent, on the strength of the prepuff particles, increased prepuff particle strength should result in greater lightweight concrete strength. The potential strength increase can be limited by the extent to which it impacts the concrete matrix. The data in the present examples suggest that the original bead particle size can be optimized to provide an optimally sized prepuff particle (which is controlled by the prepuff density), which results in the highest possible lightweight concrete strength.

In other words, within an optimum prepuff particle size and optimum density range, the wall thickness of the prepuff will provide sufficient support to allow the present lightweight concrete composition to have better strength than lightweight concrete compositions in the prior art.

The data presented herein demonstrate that unlike the presumption and approach taken in the prior art, expanded EPS particles can do surprisingly more than act simply as a void space in the concrete. More specifically, the structure and character of the prepuff particles used in the present invention can significantly enhance the strength of the resulting lightweight concrete composition.

Example 17

This example demonstrates the use of fasteners with the present light weight concrete composition and related pullout strength. This evaluation was used to compare the load capacity of a screw directly installed in the present light weight concrete (approximately 90 pcf) with conventional concrete fasteners installed in normal weight and traditional lightweight concrete.

Fastener pullout testing was performed on three types of concrete: normal weight, 143 pcf (sample MM, 140 pcf normal concrete), lightweight concrete using expanded slate (123 pcf) (sample NN, 120 pcf LWC), and lightweight concrete with EPS (87 pcf) (sample OO, 90 pcf LWC) made as described above according to the formulations in the following table.

| | Sample MM 140 pcf | Sample NN 120 pcf | Sample OO 90 pcf |
|---|---|---|---|
| EPS bead size (mm) | — | — | 0.51 |
| density (pcf) | — | — | 3.37 |
| wt % | | | |
| cement | 20.2 | 24.8 | 32.9 |
| sand | 34.6 | 36.4 | 52.7 |
| EPS | — | — | 1.86 |
| ⅜" pea gravel | 37.6 | — | — |
| ½" expanded slate | — | 29.4 | — |
| Water | 7.7 | 9.41 | 12.51 |
| vol % | | | |
| cement | 16.0 | 16 | 16 |
| sand | 30.9 | 26.5 | 28.9 |
| EPS | — | — | 37 |
| ⅜" pea gravel | 35.0 | — | — |
| ½" expanded slate | — | 39.4 | — |
| Water | 18.1 | 18.1 | 18.12 |
| compressive strength (psi) | 4941 | 9107 | 2137 |
| density (pcf) | 143 | 123 | 87 |

An apparatus was built that allowed weights to be hung vertically from each fastener using gravity to apply a load in line with the axis of the fastener. The 90 pcf LWC had 2½" standard drywall screws directly installed to approximately 1½" depth. The 120 pcf LWC had two types of fasteners installed into predrilled holes: 2¾" TAPCON® metal screw-type masonry fastening anchors (Illinois Tool Works Inc., Glenview, Ill.) installed approximately 2" deep and standard 2¼" expanding wedge-clip bolt/nut anchors installed approximately 1¼" deep. The 140 pcf normal concrete also had two types of fasteners installed into predrilled holes: 2¾" TAPCON anchors installed approximately 2" deep and standard 2¼" expanding wedge-clip bolt/nut anchors installed approximately 1¼" deep. One of the drywall screws in the lightweight concrete was backed out and re-installed into the same fastener hole for testing. Also one of the TAPCON screws was removed and reinstalled to evaluate any loss in capacity. The following tables show the data and loadings for each anchor/fastener tested.

| 90 pcf LWC Drywall Screw | | | | |
|---|---|---|---|---|
| Stone 1: | Screw Length (in) | Exposed (in) | Extract and re-install (in) | Strength (lb) |
| Screw B | 2.5 | 0.594 | 1.906 | 700 @ 30 sec. |

| 90 pcf LWC Drywall Screw | | | | |
|---|---|---|---|---|
| Stone 2: | Screw Length (in) | Exposed (in) | Installed (in) | Strength (lb) |

-continued

| | | | Extract and re-install | |
|---|---|---|---|---|
| Screw C | 2.5 | 1.031 | 1.469 | >740 >10 min. |

120 pcf LWC TAPCON Screws

| Stone 3: | Screw Length (in) | Exposed (in) | Extract and re-install (in) | Strength (lb) |
|---|---|---|---|---|
| Screw C | 2.75 | 0.875 | 1.875 | >740 >10 min. |

120 pcf LWC Bolt/Sleeve/Nut

| Stone 4: | Anchor Length (in) | Exposed (in) | Installed (in) | Strength (lb) |
|---|---|---|---|---|
| Anchor D | 2.25 | 0.875 | 1.375 | >740 >10 min. |

140 pcf normal concrete TAPCON Screws

| Stone 5: | Screw Length (in) | Exposed (in) | Extract and re-install (in) | Strength (lb) |
|---|---|---|---|---|
| Screw C | 2.75 | 0.906 | 1.844 | >740 >10 min. |

140 pcf normal concrete Bolt/Sleeve/Nut

| Stone 6: | Anchor Length (in) | Exposed (in) | Installed (in) | Strength (lb) |
|---|---|---|---|---|
| Anchor C | 2.25 | 1.094 | 1.156 | >740 >10 min. |

The holding power of the drywall screws in the 90 pcf LWC was surprisingly high as they did not easily break or tear from the concrete. The drywall screws were easy to install, only requiring a standard size electric drill. The gripping strength of the drywall screws in the 90 pcf LWC was such that if the applied drilling torque was not stopped before the screw head reached the surface of the concrete, the head of the screw would twist off. All of the fasteners held the 740 lbs. of load for at least 10 minutes except the backed out and re-inserted drywall screw in the 90 pcf LWC, which held 700 lbs. for 30 seconds before tearing loose from the concrete. This drywall screw did not break at the failure point, but pulled out of the concrete.

Taking the above data as a whole, it has been demonstrated that an optimum prepuff bead size exists (as a non-limiting example, approximately 450-550 μm resin beads expanded to an expansion factor of approximately 10-20 cc/g to a prepuff diameter of approximately 750 to 1400 μm for 90 pcf lightweight concrete) to maximize the compressive strength of the present lightweight concrete formulations. The compressive strength of the present lightweight concrete formulations can be increased by increasing the present EPS prepuff bead density. Unexpanded polystyrene resin (~40 pcf bulk density) yields LWC of high compressive strength (2500-3200 psi) considering the low density (76-100 pcf). Aggregates can be used in the present lightweight concrete formulations. The present lightweight concrete formulations, without coarse aggregates, provide a concrete composition, which may be directly fastened to using standard drills and screws. When the EPS prepuff beads are expanded to low bulk densities (for example <1 pcf), the beads have a weak internal cellular structure, which creates a weaker foam, and in turn provides a lightweight concrete composition having a lower compressive strength.

Example 18

The following examples demonstrate the use of the prepuff particles of the present invention in ready-mix formulations. Polystyrene in unexpanded bead form (F271 available from Nova Chemicals Inc.) was pre-expanded into prepuff particles having various densities as shown below. The prepuff particles were formulated into ready-mix compositions, in a 2.2 ft$^3$ mortar mixer, (READYMAN® 120, IMER USA Inc., San Francisco, Calif.) containing the components shown in the tables below. The ingredients were combined in the following order: sand (coarse, 2.5 specific gravity), coarse aggregate, Portland cement (Type 1, CEMEX), prepuff, and water. Cylinders (4"×8") were prepared according to ASTM C192 and cured according to ASTM C511.

| | Sample | | | | | |
|---|---|---|---|---|---|---|
| | PP[a] | QQ[a] | RR[a] | SS[a] | TT[a] | UU[a] |
| Weight Percent | | | | | | |
| Cement | 23.18% | 24.30% | 22.28% | 20.56% | 22.97% | 23.93% |
| Sand | 52.47% | 50.19% | 54.60% | 58.32% | 50.33% | 49.16% |
| Prepuff | 0.29% | 1.02% | 0.68% | 0.39% | 0.76% | 0.92% |
| Coarse Aggregate | 13.85% | 14.52% | 13.31% | 12.29% | 15.83% | 15.47% |
| Water | 10.20% | 9.96% | 9.13% | 8.43% | 10.11% | 10.53% |

-continued

| Volume Percent | | | | | | |
|---|---|---|---|---|---|---|
| Cement | 13.60% | 13.60% | 13.60% | 13.60% | 13.60% | 13.60% |
| Sand | 38.17% | 34.84% | 41.34% | 47.84% | 36.95% | 34.65% |
| Prepuff | 19.38% | 24.00% | 17.50% | 11.00% | 19.07% | 22.08% |
| Coarse Aggregate | 10.00% | 10.00% | 10.00% | 10.00% | 11.53% | 10.82% |
| Water | 18.85% | 17.56% | 17.56% | 17.56% | 18.85% | 18.85% |
| Slump (in) | 2.75 | 4 | 4 | 3 | 2 | 1.25 |
| Wet Density (pcf) | 120.4 | 113.1 | 117.7 | 125.36 | 116.56 | 113.6 |
| W/C Ratio | 0.44 | 0.44 | 0.44 | 0.44 | 0.44 | 0.44 |
| Prepuff Density (pcf) | 1.3 | 3.45 | 3.45 | 3.45 | 3.45 | 3.45 |
| Expansion Factor (cc/g) | 48 | 18 | 18 | 18 | 18 | 18 |
| Compressive Strength | | | | | | |
| 3-day | 3000 | 2106 | 2179 | 2400 | 2728 | 2495 |
| 7-day | 3542 | 2260 | 2516 | 2809 | 3075 | 2825 |
| 28-day | 4132 | 2800 | 3100 | 3600 | 3760 | 3459 |

| | Sample | | | | |
|---|---|---|---|---|---|
| | VV$^a$ | WW$^a$ | XX$^a$ | YY(b) | ZZ$^{ac}$ |
| Weight Percent | | | | | |
| Cement | 24.93% | 22.94% | 21.26% | 15.91 | 22.97% |
| Sand | 47.38% | 51.98% | 55.87% | 58.55 | 50.68% |
| Prepuff | 1.81% | 1.27% | 0.80% | .30 | 0.30% |
| Coarse Aggregate | 14.90% | 13.71% | 12.71% | 18.25 | 15.94% |
| Water | 10.97% | 10.10% | 9.36% | 7 | 10.11% |
| Volume Percent | | | | | |
| Cement | 13.60% | 13.60% | 13.60% | 9.41 | 13.60% |
| Sand | 32.05% | 38.21% | 44.32% | 42.94 | 37.22% |
| Prepuff | 25.50% | 19.34% | 13.23% | 18.22 | 18.72% |
| Coarse Aggreate | 10.00% | 10.00% | 10.00% | 13.39 | 11.61% |
| Water | 18.85% | 18.85% | 18.85% | 13.04 | 18.85% |
| Slump (in) | 2.25 | 4 | 2.25 | 1 | 7 |
| Wet Density (pcf) | 106.72 | 115.2 | 123.68 | 118.96 | 120.5 |
| W/C Ratio | 0.44 | 0.44 | 0.44 | 0.62 | 0.44 |
| Prepuff Density (pcf) | 5.65 | 5.65 | 5.65 | 1.4 | 1.4 |
| Expansion Factor (cc/g) | 11 | 11 | 11 | 45 | 45 |
| Compressive Strength | | | | | |
| 3-day | 2036 | 2696 | 3425 | 1155 | 2496 |
| 7-day | 2225 | 3035 | 3978 | 1442 | 3051 |
| 28-day | 2738 | 3600 | 4654 | 1685 | 3394 |

$^a$coarse aggregate was 1¼ inch river gravel
$^b$coarse aggregate was ⅜ inch river gravel
$^c$includes 1 ounce/cwt of THOROBOND ® polyvinyl acetate bonding agent from Degussa Building Systems, Shakopee, MN.

The data indicate that excellent compressive strength can be obtained using ready-mix formulations containing prepuff particles according to the invention.

The present invention has been described with reference to specific details of particular embodiments thereof. It is not intended that such details be regarded as limitations upon the scope of the invention except insofar as and to the extent that they are included in the accompanying claims.

We claim:

1. A method of placing concrete comprising:
combining sand, one or more aggregates, cement, prepuff particles; water, and optionally a water reducer to form a mixture,
making the mixture in, or placing the mixture in a cement mixer truck;
mixing the mixture in the cement mixer truck while transporting the mixture from a central plant to a job site; and
discharging the mixture from the cement mixer truck at the job site;
wherein the mixture comprises:
8-20 volume percent cement,
11-50 volume percent sand,
10-31 volume percent prepuff particles,
9-40 volume percent coarse aggregate, and
10-22 volume percent water;
wherein the prepuff particles have an average particle diameter of from 0.2 mm to 5 mm, a bulk density of from 0.02 g/cc to 0.48 g/cc, a continuous outer layer, and an aspect ratio of from 1 to 3;
wherein the slump value of the mixture measured according to ASTM C 143 at the job site is from 2 to 8 inches.

2. The method according to claim 1, wherein after the ready-mix concrete composition is set for 28 days, has a compressive strength of at least 1400 psi as tested according to ASTM C39.

3. The method according to claim 1, wherein the prepuff particles comprise expanded polymer particles having an inner cell wall thickness of at least at least 0.15 μm.

4. The method according to claim 1, wherein the particles comprise expanded polymer particles comprising one or more polymers selected from the group consisting of homopolymers of vinyl aromatic monomers;
copolymers of at least one vinyl aromatic monomer with one or more of divinylbenzene, conjugated dienes, alkyl methacrylates, alkyl acrylates, acrylonitrile, and/or maleic anhydride; polyolefins; polycarbonates; polyesters; polyamides; natural rubbers; synthetic rubbers; and combinations thereof.

5. The method according to claim 1, wherein the prepuff particles comprise expanded polymer particles prepared by expanding a polymer bead having an unexpanded average resin particle size of from about 0.2 mm to about 2 mm.

6. The method according to claim 1, wherein the cement comprises one or more materials selected from the group consisting of Portland cements, pozzolana cements, gypsum cements, gypsum compositions, aluminous cements, magnesia cements, silica cements, slag cements, Type I cement, Type IA cement, Type II cement, Type IIA cement, Type III cement, Type IIIA cement, Type IV cement and Type V cement.

7. The method according to claim 1, wherein the composition comprises plasticizers and/or fibers.

8. The method according to claim 7, wherein the fibers are selected from the group consisting of glass fibers, silicon carbide, aramid fibers, polyester, carbon fibers, composite fibers, fiberglass, combinations thereof, fabric containing said fibers, and fabric containing combinations of said fibers.

9. The method according to claim 1, wherein the coarse aggregate is selected from the group consisting of stone, gravel, ground granulated blast furnace slag, fly ash, glass, silica, expanded slate, clay; pumice, perlite, vermiculite, scoria, diatomite, expanded shale, expanded clay, expanded slag, fumed silica, pelletized aggregate, extruded fly ash, tuff, macrolite, slate, expanded blast furnace slag, sintered fly ash, coal cinders, and combinations thereof.

10. The method according to claim 1, wherein the mixture has a density of from about 40 to about 130 lb./ft$^3$.

11. The method according to claim 1 wherein the water to cement ratio is greater than 0.40.

12. The method according to claim 1, wherein the mixture comprises one or more adjuvants and fillers selected from the group consisting of clay, fly ash, air entrainment agents, colorants, and superplasticizers.

13. The method according to claim 1, wherein the water reducer is selected from the group consisting of lignosulfonates, sodium naphthalene sulfonate formaldehyde condensates, sulfonated melamine-formaldehyde resins, sulfonated vinylcopolymers, urea resins, and salts of hydroxy- or polyhydroxy-carboxylic acids, and combinations thereof.

* * * * *